(12) United States Patent
Breuer et al.

(10) Patent No.: US 9,698,908 B2
(45) Date of Patent: Jul. 4, 2017

(54) SUB-SAMPLING RASTER LINES IN ROLLING SHUTTER MODE FOR LIGHT-BASED COMMUNICATION

(71) Applicants: Christian Breuer, Newburyport, MA (US); Anant Aggarwal, Waltham, MA (US); Barry Stout, Beverly, MA (US)

(72) Inventors: Christian Breuer, Newburyport, MA (US); Anant Aggarwal, Waltham, MA (US); Barry Stout, Beverly, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

(21) Appl. No.: 14/870,060

(22) Filed: Sep. 30, 2015

(65) Prior Publication Data
US 2017/0093490 A1    Mar. 30, 2017

(51) Int. Cl.
H04B 10/00 (2013.01)
H04B 10/116 (2013.01)
H04B 10/69 (2013.01)
H04B 10/67 (2013.01)

(52) U.S. Cl.
CPC ......... H04B 10/116 (2013.01); H04B 10/671 (2013.01); H04B 10/69 (2013.01)

(58) Field of Classification Search
CPC ..... H04B 10/116; H04B 10/671; H04B 10/69
See application file for complete search history.

(56) References Cited

U.S. PATENT DOCUMENTS

| | | | | |
|---|---|---|---|---|
| 5,835,388 A | * | 11/1998 | Helm | H04B 10/114 398/106 |
| 6,243,055 B1 | * | 6/2001 | Fergason | G02B 5/3083 345/32 |
| 7,627,879 B2 | * | 12/2009 | Koplar | G06Q 10/02 725/136 |
| 2002/0089722 A1 | * | 7/2002 | Perkins | G01S 1/70 398/140 |
| 2005/0265731 A1 | * | 12/2005 | Keum | H04B 10/114 398/183 |
| 2006/0056855 A1 | * | 3/2006 | Nakagawa | G09F 9/33 398/183 |
| 2006/0067707 A1 | * | 3/2006 | Maniam | H04B 10/116 398/183 |
| 2006/0071613 A1 | * | 4/2006 | Lovato | H04B 10/1149 315/291 |

(Continued)

Primary Examiner — Danny Leung
(74) Attorney, Agent, or Firm — Yutian Ling

(57) ABSTRACT

Light-based communication (LCom) techniques are disclosed for decoding LCom signals using a sub-raster line sampling process. In accordance with an embodiment, a system is provided that is configured to sub-sample each raster line to capture data at a much faster sampling rate, which in turn allows for longer LCom messages and faster response time. The sub-sampling of the raster lines can be carried out in a rolling shutter mode. Without such sub-sampling of the raster lines, decoding the LCom signals may be effectively limited by the raster line frequency, given that the raster line sampling rate is tied to the horizontal resolution of the camera. However, by sub-sampling the raster lines as provided herein, the sampling rate can be a combination of horizontal and vertical pixels which represents a substantial improvement over standard raster line based rolling shutter modes.

26 Claims, 12 Drawing Sheets

(56) References Cited

U.S. PATENT DOCUMENTS

| | | | |
|---|---|---|---|
| 2006/0239689 A1* | 10/2006 | Ashdown | H04B 10/1141 398/130 |
| 2006/0256070 A1* | 11/2006 | Moosavi | H04B 10/1141 345/104 |
| 2007/0008258 A1* | 1/2007 | Yamamoto | H04B 10/116 345/83 |
| 2007/0024571 A1* | 2/2007 | Maniam | H04B 10/116 345/102 |
| 2008/0044188 A1* | 2/2008 | Kagawa | H04B 10/1141 398/128 |
| 2008/0253202 A1* | 10/2008 | Yu | H04B 10/1143 365/189.09 |
| 2008/0253766 A1* | 10/2008 | Yu | H04B 10/1143 398/41 |
| 2008/0310850 A1* | 12/2008 | Pederson | G07C 9/00158 398/135 |
| 2009/0002265 A1* | 1/2009 | Kitaoka | G09G 3/003 345/4 |
| 2009/0026978 A1* | 1/2009 | Robinson | H05B 37/0272 315/294 |
| 2009/0052902 A1* | 2/2009 | Shinokura | H04B 10/116 398/118 |
| 2009/0100384 A1* | 4/2009 | Louch | G06F 1/1626 715/863 |
| 2009/0171571 A1* | 7/2009 | Son | G01C 21/20 701/532 |
| 2009/0180780 A1* | 7/2009 | Ann | H04B 10/1149 398/128 |
| 2009/0189530 A1* | 7/2009 | Ashdown | H05B 33/0818 315/152 |
| 2009/0196622 A1* | 8/2009 | Shin | H04B 10/1149 398/118 |
| 2009/0208221 A1* | 8/2009 | Sasai | H04B 1/707 398/130 |
| 2010/0188004 A1* | 7/2010 | Baggen | H04B 10/1141 315/209 R |
| 2010/0209119 A1* | 8/2010 | Lee | H04B 10/116 398/183 |
| 2010/0284697 A1* | 11/2010 | Bae | H04B 10/1149 398/130 |
| 2010/0327754 A1* | 12/2010 | Schenk | H05B 37/02 315/151 |
| 2011/0069957 A1* | 3/2011 | Kim | H04B 3/542 398/75 |
| 2011/0128384 A1* | 6/2011 | Tiscareno | H04B 10/1141 348/164 |
| 2011/0170872 A1* | 7/2011 | Shin | H04B 10/1149 398/78 |
| 2011/0204805 A1* | 8/2011 | Li | H05B 33/086 315/210 |
| 2011/0217044 A1* | 9/2011 | Kang | H04B 10/1149 398/67 |
| 2012/0002974 A1* | 1/2012 | Schenk | H04B 10/1149 398/130 |
| 2012/0154824 A1* | 6/2012 | Kim | G01S 5/16 356/623 |
| 2012/0294549 A1* | 11/2012 | Doepke | G06T 3/4038 382/294 |
| 2012/0312976 A1* | 12/2012 | Boulanger | H04N 5/33 250/252.1 |
| 2013/0126713 A1* | 5/2013 | Haas | H04B 10/116 250/208.2 |
| 2013/0141554 A1* | 6/2013 | Ganick | G01S 1/70 348/61 |
| 2013/0183042 A1* | 7/2013 | Knapp | G08C 23/04 398/106 |
| 2013/0208184 A1* | 8/2013 | Castor | H04B 10/1149 348/552 |
| 2013/0236183 A1* | 9/2013 | Chao | H04B 10/116 398/101 |
| 2013/0251374 A1* | 9/2013 | Chen | H04B 10/1141 398/118 |
| 2013/0256422 A1* | 10/2013 | Osborne | H04B 10/116 235/494 |
| 2013/0266327 A1* | 10/2013 | Bae | H04B 10/116 398/131 |
| 2013/0330088 A1* | 12/2013 | Oshima | H04B 10/11 398/130 |
| 2014/0010549 A1* | 1/2014 | Kang | H04B 10/116 398/118 |
| 2014/0029494 A1* | 1/2014 | Sundaram | H04W 52/0235 370/311 |
| 2014/0045549 A1* | 2/2014 | Ryan | H04N 5/3532 455/556.1 |
| 2014/0186026 A1* | 7/2014 | Oshima | H04B 10/116 398/25 |
| 2014/0186050 A1* | 7/2014 | Oshima | H04B 10/1143 398/118 |
| 2014/0186052 A1* | 7/2014 | Oshima | H04B 10/1143 398/130 |
| 2014/0204129 A1* | 7/2014 | Oshima | G09G 5/10 345/690 |
| 2014/0207517 A1* | 7/2014 | Oshima | H04N 5/2356 705/7.29 |
| 2014/0268766 A1* | 9/2014 | Lu | F21V 21/30 362/249.1 |
| 2014/0375982 A1* | 12/2014 | Jovicic | G01B 11/14 356/72 |
| 2015/0098709 A1* | 4/2015 | Breuer | H04B 10/116 398/118 |
| 2015/0163459 A1* | 6/2015 | Jovicic | H04N 7/183 348/143 |
| 2015/0223277 A1* | 8/2015 | Jovicic | H04B 10/116 455/41.2 |
| 2015/0264278 A1* | 9/2015 | Kleekajai | H04N 5/2351 348/227.1 |
| 2015/0270896 A1* | 9/2015 | Van Bommel | H05B 37/0272 398/118 |
| 2015/0280820 A1* | 10/2015 | Breuer | H04B 10/116 398/128 |
| 2015/0280822 A1* | 10/2015 | Breuer | H04B 10/116 398/130 |
| 2015/0280823 A1* | 10/2015 | Breuer | H04B 10/1149 398/25 |
| 2015/0280829 A1* | 10/2015 | Breuer | G01C 3/32 398/118 |
| 2015/0281905 A1* | 10/2015 | Breuer | H04W 4/026 398/118 |
| 2015/0311977 A1* | 10/2015 | Jovicic | H04B 10/116 398/106 |

* cited by examiner

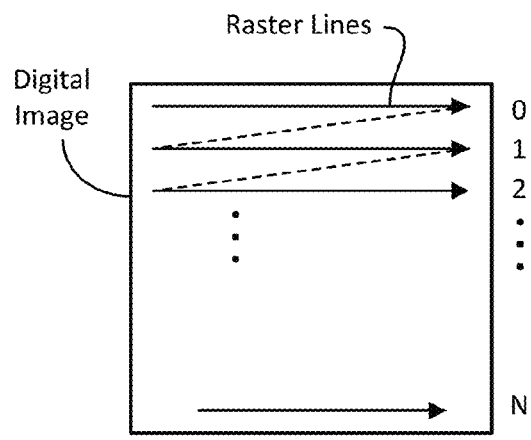
Figure 6A
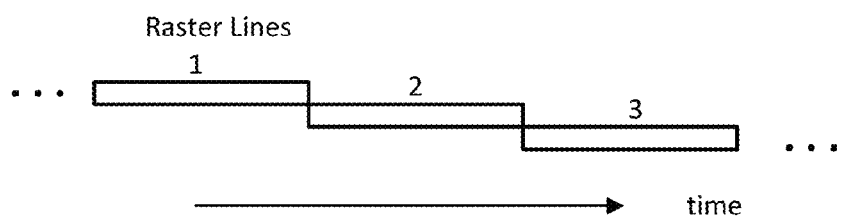
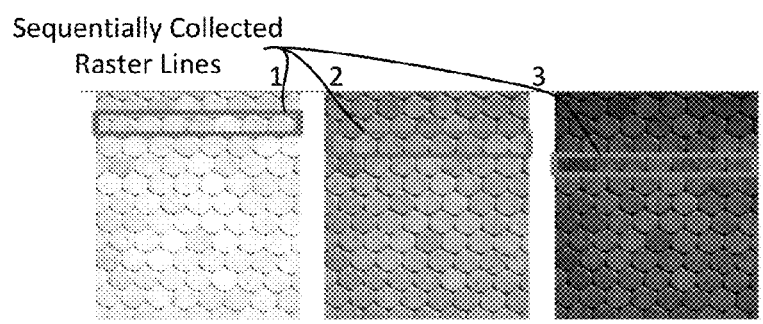
Figure 6B
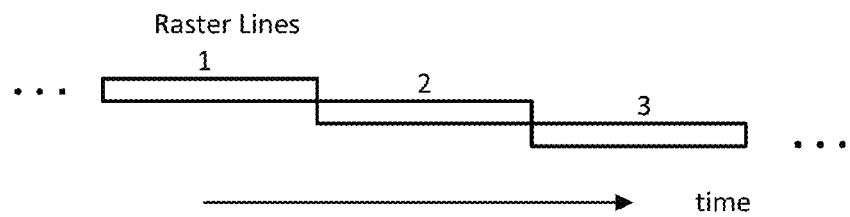

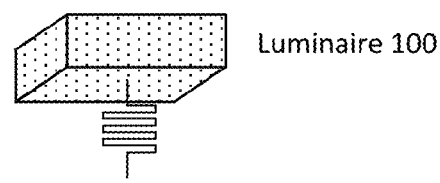
Figure 8
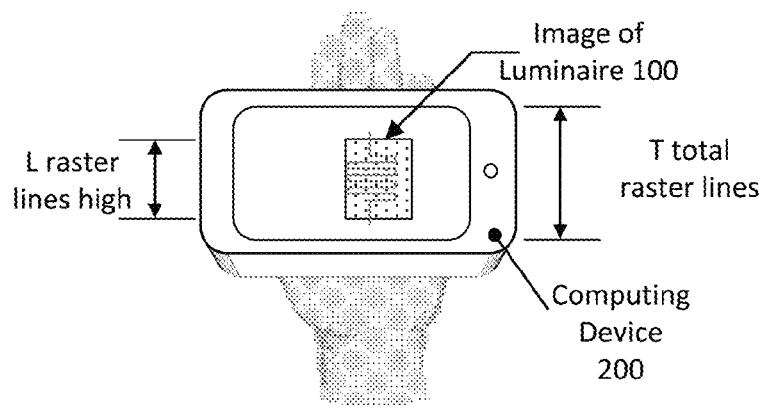
Figure 9
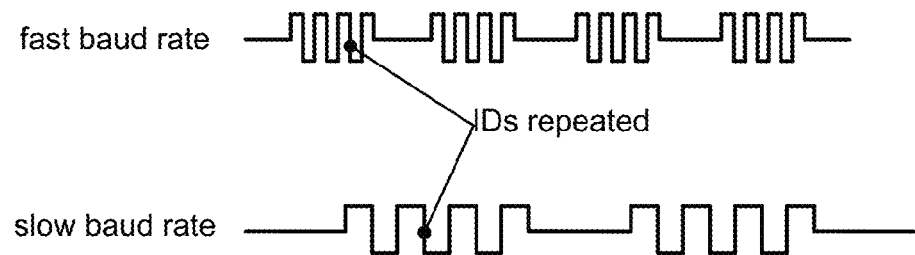

SUB-SAMPLING RASTER LINES IN ROLLING SHUTTER MODE FOR LIGHT-BASED COMMUNICATION

FIELD OF THE DISCLOSURE

The present disclosure relates to solid-state lighting (SSL) and more particularly to light-based communication via SSL.

BACKGROUND

Global positioning system (GPS) devices are commonly used to facilitate navigation on Earth. These GPS devices are designed to communicate with orbiting satellites that transmit location and time information. Closer to the Earth's surface, such satellite-based navigation can be supplemented using local area wireless technologies, such as Wi-Fi, which utilize radio frequency (RF) signals to communicate with nearby compatible devices. These types of wireless technologies typically employ wireless access points (Wi-Fi hotspots) to establish network access, and in cases of secured wireless networks, a password or other security credentials normally must be provided in order to gain network access.

BRIEF DESCRIPTION OF THE DRAWINGS

FIGS. 6A and 6B each illustrate example orientations between luminaires and a computing device, and how that affects the ability of the device raster lines to decode LCom messages from the luminaires.

FIG. 8 illustrates measurement of the length of the luminaire in raster lines which corresponds to the ability to resolve the luminaire's ID, in accordance with an embodiment of the present disclosure.

FIG. 9 illustrates different baud rates, according to some embodiments of the present disclosure.

Figure 1:
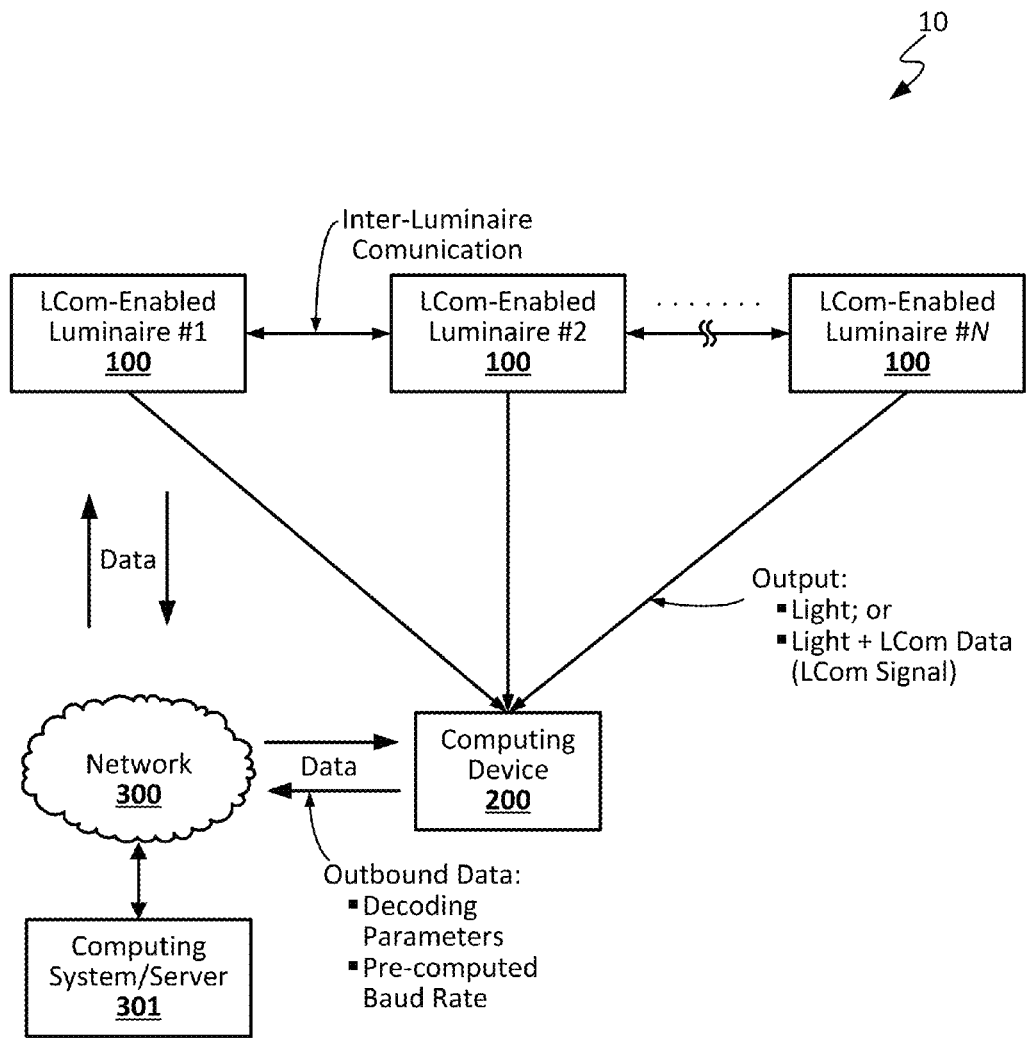
FIG. 1 is a block diagram illustrating an example light-based communication (LCom) system configured in accordance with an embodiment of the present disclosure.

These and other features of the present embodiments will be understood better by reading the following detailed description, taken together with the figures herein described. The accompanying drawings are not intended to be drawn to scale. In the drawings, each identical or nearly identical component that is illustrated in various figures may be represented by a like numeral. For purposes of clarity, not every component may be labeled in every drawing.

DETAILED DESCRIPTION

Light-based communication (LCom) generally refers to the communication between a luminary and an optical receiver device, such as a smartphone, tablet, or other mobile computing device, using a pulsing light signal that is encoded with data. In particular, the receiver device includes a camera or other imaging circuitry capable of sensing pulsing light from the luminary, and may further include one or more processors for processing the received light. The light utilized in LCom may be of any spectral band, visible or otherwise, and may be of any intensity, as desired for a given target application or end-use. With respect to visible light, note that the pulsing is done at a relatively high frequency (e.g., 1 KHz or higher), and is generally imperceptible to the human eye, so that light-based communication can co-exist with a given illumination scheme. One application of LCom is indoor navigation, which can be used to supplement or otherwise enhance the precision and accuracy over other technologies such as GPS and WiFi locationing. For instance, LCom could be used in retail setting to guide customers (empowered with a smartphone or other suitable mobile computing device) to products of interest on a given shelf within a given store. LCom for indoor navigation assumes that the light fixture itself knows its location. However, a non-trivial challenge associated with LCom is creating an encoding/decoding schema that works across most if not all mobile computing devices.

In particular, the ability of a computing device to decode an LCom signal is generally limited by the raster line frequency of that device's camera. Some LCom receiver techniques thus use the rolling shutter property of the camera to sample the pulsing light of LCom. In more detail, many computing devices having a camera utilize a CMOS camera sensor. The CMOS sensor can be equated to an array of light sensors. The array can be further broken down into rows of pixels called raster lines. The camera captures an image by sequentially capturing raster lines. FIG. 6A graphically depicts this process and shows how each entire raster line is collected in order (0 through N raster lines) for a given image. This process is referred to as rolling shutter mode, wherein each raster line is fully sampled before moving on to the next one. However, typical cameras found in mobile computing devices such as smartphones do not operate in such a 'true' rolling shutter mode. Rather, an overlapping rolling shutter mode is actually employed. In more detail, once the raster line is active, image data is collected for a specified time equivalent to the shutter speed. In general, once this time has expired, the pixels values are read and transferred to an output buffer for subsequent processing. So, with respect to using such a camera to detect an LCom pulsing signal, if each raster line is collected in sequence then each raster line represents the light level at a certain point in time. If the light source is pulsing, for instance, on a tile floor, then the raster lines would manifest as bands ranging from light to dark, depending on the timing of capture. For example, FIG. 6B shows three snap shots in time of a light pulsing in a given (arbitrary) environment. The boxes superimposed over each image represent the current raster line being collected at that point in time, which continues in a sequential fashion. Even using the rolling shutter approach, the effective sampling rate of the CMOS camera is limited as raster lines overlap in time. Typical cameras may have 30 to 60 raster lines overlap which divides the useful number of raster lines from something like 720 total raster lines to 120 (e.g., 720/60) effective raster lines. This limits the ability the camera to read longer bit streams. So, considering the fact that typical CMOS cameras employ an overlapping rolling shutter mode and were not intended for processing LCom signals, simply measuring an LCom signal using just raster lines may produce unsatisfactory results, especially for longer LCom pulse trains.

Thus, and in accordance with an embodiment of the present disclosure, a system is provided that is configured to sub-sample each raster line to capture data at a much faster sampling rate, which in turn allows for longer LCom messages and faster response time. The sub-sampling of the raster lines can be carried out in a rolling shutter mode. Without such sub-sampling of the raster lines, decoding the LCom signals may be effectively limited by the raster line frequency, given that the raster line sampling rate is tied to the horizontal resolution of the camera. However, by sub-sampling the raster lines as provided herein, the sampling rate can be a combination of horizontal and vertical pixels which represents a substantial improvement over standard raster line based rolling shutter modes.

In accordance with an embodiment, each raster line is divided into sub-raster lines or individual pixels. Each pixel behaves the same way as a raster line, in that each pixel is sequentially measured. This sequential sampling allows the camera to sample at much higher frequencies than the original raster lines. Utilizing this sub-raster line (at the pixel level) to sample data can either supplement the raster line data in some embodiments, or such sub-raster line sampling can be the dominant or only data collection method. As will be appreciated in light of this disclosure, stitching sub-raster lines from different raster lines can be accomplished based on knowing the timing of pixel collecting, which is constant for a given camera. Thus, these known timing parameters can be acquired and used to reconstruct the waveform. As will be further appreciated, factors such as delays between raster lines and delays between frames can be corrected since the LCom message from the luminaire repeats continuously. Therefore any gaps in the bit pattern can be filled in with future data. Numerous applications will be apparent in light of this disclosure.

One application where the techniques provided herein can be used is for LCom-based indoor navigation, which relies on luminaires transmitting their location to a user mobile computing device (e.g., smartphone, tablet, or other mobile computing device capable of receiving a processing LCom signals). Existing smartphones, tablets, and other such mobile computing devices typically utilize a combination of global positioning system (GPS) and Wi-Fi technologies to provide navigation capabilities, such as various Wi-Fi positioning systems (WPS). However, these existing GPS-based and Wi-Fi-based techniques are not particularly well-suited for indoor navigation. In particular, GPS has an accuracy of only several meters, and the availability and range of Wi-Fi network connections are limited by factors such as the placement of Wi-Fi hotspots, security restrictions imposed by network providers, and other environmental factors. Thus, the combination of GPS and Wi-Fi can fail to achieve sufficiently refined accuracies for purposes of indoor navigation. As will be appreciated, the LCom techniques provided herein can be used to supplement such navigation systems, but the techniques may also be used on their own. Any number of other applications may also benefit from the raster line sub-sampling techniques.

A number of advantages of sub-sampling the raster lines in the rolling shutter mode will be apparent in light of this disclosure. For instance, faster sampling rates by a factor of at least 10 to 100 can be achieved. In addition, the sub-sampling techniques provided herein can be used to support longer data packets. For instance, information sent through LCom might include luminaire ID, firmware version of lighting controller (or other controller), coupon information (e.g., for LCom-based retail applications targeting consumers), or commissioning data (e.g., location information, such as relative and/or absolute location information of a given luminaire). Also, an LCom communication link implemented with raster line sub-sampling can be less prone than standard LCom systems to error from, for example, the user shaking or wobbling the receiving computing device while reading LCom signals being transmitted by local luminaires.

System Architecture

FIG. 1 is a block diagram illustrating an example light-based communication (LCom) system 10 configured in accordance with an embodiment of the present disclosure. As can be seen, system 10 may include one or more LCom-enabled luminaires 100 configured for light-based communicative coupling with a receiver computing device 200 via LCom signal(s). As discussed herein, such LCom may be provided, in accordance with some embodiments, via visible light-based signals. In some cases, LCom may be provided in only one direction; for instance, LCom data may be passed from a given LCom-enabled luminaire 100 (e.g., the transmitter) to a computing device 200 (e.g., the receiver), or from a computing device 200 (e.g., the transmitter) to a given LCom-enabled luminaire 100 (e.g., the receiver). In some other cases, LCom may be provided in a bi-directional fashion between a given LCom-enabled luminaire 100 and a computing device 200, where both act as a transceiver device capable of transmitting and receiving.

In some cases in which system 10 includes a plurality of LCom-enabled luminaires 100, all (or some sub-set thereof) may be configured for communicative coupling with one another so as to provide inter-luminaire communication. In one such scenario, for instance, the inter-luminaire communication can be used to notify other luminaries 100 that a given computing device 200 is currently present, as well as the baud rate chosen for that particular device 100, and/or any other useful information, whether that information be about the user or an intended navigation path, or information used to facilitate LCom-based communication. Such inter-luminaire communication is not needed, however, as will be appreciated in light of this disclosure.

As can be further seen in this example embodiment, system 10 allows for communicative coupling with a network 300 and one or more servers or other computer systems 301. Communicative coupling may be provided, for example, between network 300 and computing device 200 and/or one or more LCom-enabled luminaires 100, as desired. The network 300 may be a local area wireless network, a local wired network, or a combination of local wired and wireless networks, and may further include access to a wide area network such as the Internet or a campus-wide network. In short, network 300 can be any communications network. As will be further appreciated herein, prior to establishing an LCom communication link between a given device 200 and one or more of the luminaires 100, the network 300 may be used by the device 200 to provide that device's decoding parameters to the luminaires 100 or computer system 300, so that a suitable baud rate can be identified and then adopted by the luminaires 100 to initiate LCom communications. In still other embodiments, a pre-computed baud rate suitable for the given device 200 can be provided to the luminaire 100 by the device 200 itself, or by a computer system 301 via network 300 once the given device 200 has been identified by that computer system 301.

The computer systems 301 may be any suitable computing system capable of communicating over a network 300, such as a cloud-based server computer, and may be programmed or otherwise configured to provide an LCom related service, according to some embodiments. For example, an LCom related service might be that the computer system 301 is configured to provide storage of currently available receiver device decoding parameters indexed by device manufacture and model, for example. In that way, only the computing device make and model need be known and the decoding parameters could then be looked up and passed to the luminaires 100 so that a suitable baud rate could be computed and adopted by the luminaires 100. In still other embodiments, a suitable baud rate can be looked up on the computer system 301, and that baud rate can then be passed to the luminaries 100 to initiate LCom communication with the device 200. In still other embodiments, the baud rate can be fixed and assumed, based on a given system. Numerous other such configurations will be apparent in light of this disclosure.

Figure 2A:
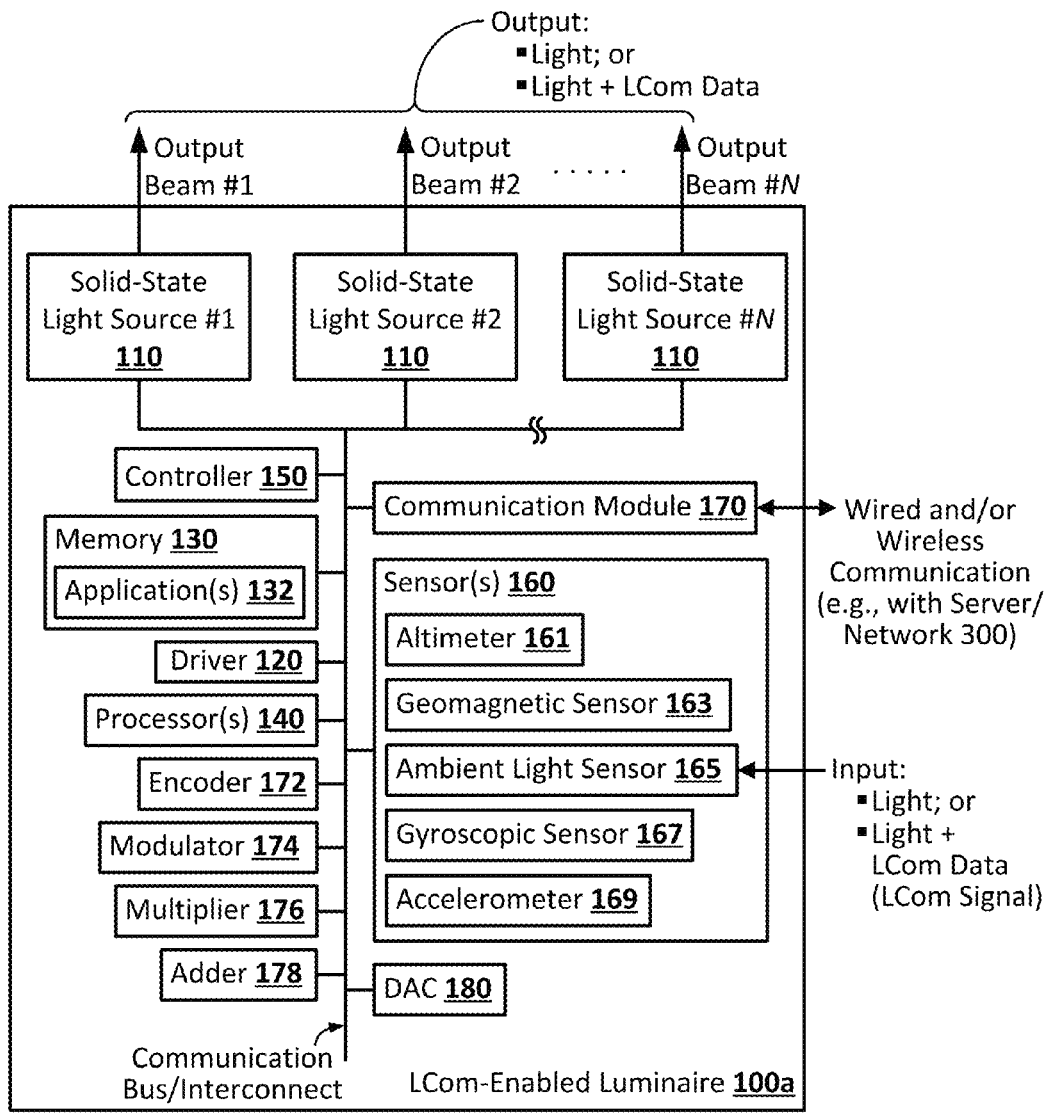
FIG. 2A is a block diagram illustrating an LCom-enabled luminaire configured in accordance with an embodiment of the present disclosure.
Figure 2B:
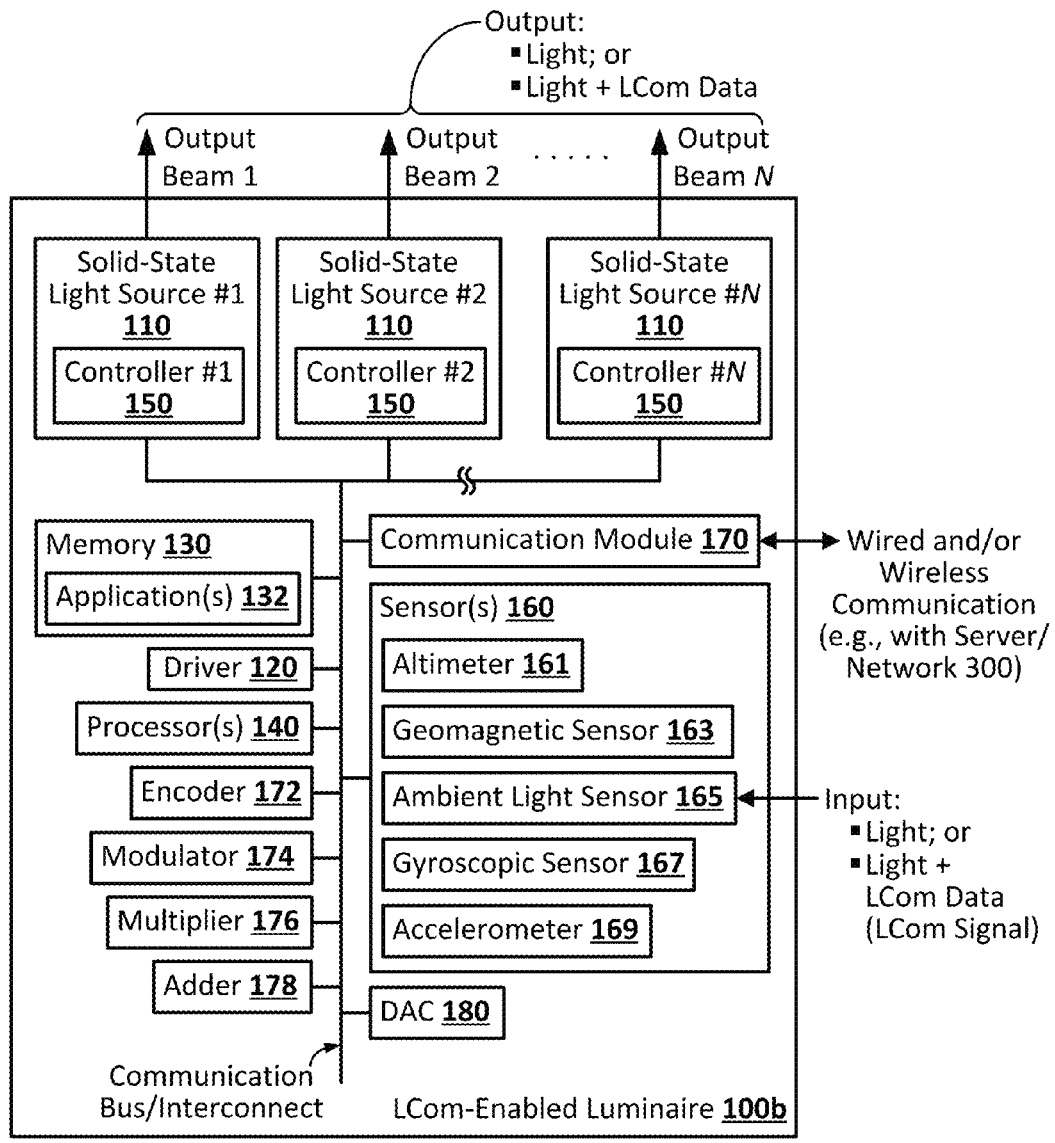
FIG. 2B is a block diagram illustrating an LCom-enabled luminaire configured in accordance with another embodiment of the present disclosure.

FIG. 2A is a block diagram illustrating an LCom-enabled luminaire 100a configured in accordance with an embodiment of the present disclosure. FIG. 2B is a block diagram illustrating an LCom-enabled luminaire 100b configured in accordance with another embodiment of the present disclosure. As can be seen, a difference between luminaire 100a and luminaire 100b is with respect to the location of controller 150. For consistency and ease of understanding of the present disclosure, LCom-enabled luminaires 100a and 100b hereinafter may be collectively referred to generally as an LCom-enabled luminaire 100, except where separately referenced. Further note that while various modules are shown as distinct modules for purposes of illustration, any number of the modules may be integrated with one or more other modules. For instance, the controller 150 may be integrated with the driver 120. Similarly, the processor(s) 140 and memory 130 may be integrated within the controller 150. Numerous other configurations can be used.

As can be seen, a given LCom-enabled luminaire 100 may include one or more solid-state light sources 110, in accordance with some embodiments. The quantity, density, and arrangement of solid-state light sources 110 utilized in a given LCom-enabled luminaire 100 may be customized, as desired for a given target application or end-use. A given solid-state light source 110 may include one or more solid-state emitters, which may be any of a wide range of semiconductor light source devices, such as, for example, a light-emitting diode (LED), an organic light-emitting diode (OLED), a polymer light-emitting diode (PLED), or a combination of any of these. A given solid-state emitter may be configured to emit electromagnetic radiation, for example, from the visible spectral band and/or other portions of the electromagnetic spectrum not limited to the infrared (IR) spectral band and/or the ultraviolet (UV) spectral band, as desired for a given target application or end-use. In some embodiments, a given solid-state emitter may be configured for emissions of a single correlated color temperature (CCT) (e.g., a white light-emitting semiconductor light source). In other embodiments, a given solid-state emitter may be configured for color-tunable emissions. For instance, in some cases, a given solid-state emitter may be a multi-color (e.g., bi-color, tri-color, etc.) semiconductor light source configured for a combination of emissions, such as: (1) red-green-blue (RGB); (2) red-green-blue-yellow (RGBY); (3) red-green-blue-white (RGBW); (4) dual-white; and/or (5) a combination of any one or more thereof. In some cases, a given solid-state emitter may be configured as a high-brightness light source. In some embodiments, a given solid-state emitter may be provided with a combination of any one or more of the aforementioned example emissions capabilities. In any case, a given solid-state emitter can be packaged or non-packaged, as desired, and in some cases may be populated on a printed circuit board (PCB) or other suitable intermediate/substrate. In some cases, power and/or control connections for a given solid-state emitter may be routed from a given PCB to a driver 120 (discussed in turn below) and/or other devices/componentry, as desired. Other suitable configurations for the one or more solid-state emitters of a given solid-state light source 110 will depend on a given application and will be apparent in light of this disclosure.

A given solid-state light source 110 also may include one or more optics optically coupled with its one or more solid-state emitters. In accordance with some embodiments, the optic(s) of a given solid-state light source 110 may be configured to transmit the one or more wavelengths of interest of the light (e.g., visible, UV, IR, etc.) emitted by solid-state emitter(s) optically coupled therewith. To that end, the optic(s) may include an optical structure (e.g., a window, lens, dome, etc.) formed from any of a wide range of optical materials, such as, for example: (1) a polymer, such as poly(methyl methacrylate) (PMMA) or polycarbonate; (2) a ceramic, such as sapphire ($Al_2O_3$) or yttrium aluminum garnet (YAG); (3) a glass; and/or (4) a combination of any one or more thereof. In some cases, the optic(s) of a given solid-state light source 110 may be formed from a single (e.g., monolithic) piece of optical material to provide a single, continuous optical structure. In some other cases, the optic(s) of a given solid-state light source 110 may be formed from multiple pieces of optical material to provide a multi-piece optical structure. In some cases, the optic(s) of a given solid-state light source 110 may include optical features, such as, for example: (1) an anti-reflective (AR) coating; (2) a reflector; (3) a diffuser; (4) a polarizer; (5) a brightness enhancer; (6) a phosphor material (e.g., which converts light received thereby to light of a different wavelength); and/or (7) a combination of any one or more thereof. In some embodiments, the optic(s) of a given solid-state light source 110 may be configured, for example, to focus and/or collimate light transmitted therethrough. Other suitable types, optical transmission characteristics, and configurations for the optic(s) of a given solid-state light source 110 will depend on a given application and will be apparent in light of this disclosure.

In accordance with some embodiments, the one or more solid-state light sources 110 of a given LCom-enabled luminaire 100 may be electronically coupled with a driver 120. In some cases, driver 120 may be an electronic driver (e.g., single-channel; multi-channel) configured, for example, for use in controlling one or more solid-state emitters of a given solid-state light source 110. For instance, in some embodiments, driver 120 may be configured to control the on/off state, dimming level, color of emissions, correlated color temperature (CCT), and/or color saturation of a given solid-state emitter (or grouping of emitters). To such ends, driver 120 may utilize any of a wide range of driving techniques, including, for example: (1) a pulse-width modulation (PWM) dimming protocol; (2) a current dimming protocol; (3) a triode for alternating current (TRIAC) dimming protocol; (4) a constant current reduction (CCR) dimming protocol; (5) a pulse-frequency modulation (PFM) dimming protocol; (6) a pulse-code modulation (PCM) dimming protocol; (7) a line voltage (mains) dimming protocol (e.g., dimmer is connected before input of driver 120 to adjust AC voltage to driver 120); and/or (8) a combination of any one or more thereof. Other suitable configurations for driver 120 and lighting control/driving techniques will depend on a given application and will be apparent in light of this disclosure.

As will be appreciated in light of this disclosure, a given solid-state light source 110 also may include or otherwise be operatively coupled with other circuitry/componentry, for example, which may be used in solid-state lighting. For instance, a given solid-state light source 110 (and/or host LCom-enabled luminaire 100) may be configured to host or otherwise be operatively coupled with any of a wide range of electronic components, such as: (1) power conversion circuitry (e.g., electrical ballast circuitry to convert an AC signal into a DC signal at a desired current and voltage to power a given solid-state light source 110); (2) constant current/voltage driver componentry; (3) transmitter and/or receiver (e.g., transceiver) componentry; and/or (4) local processing componentry. When included, such componentry may be mounted, for example, on one or more driver 120 boards, in accordance with some embodiments.

As can be further seen from FIGS. 2A-2B, a given LCom-enabled luminaire 100 may include memory 130 and one or more processors 140. Memory 130 can be of any suitable type (e.g., RAM and/or ROM, or other suitable memory) and size, and in some cases may be implemented with volatile memory, non-volatile memory, or a combination thereof. A given processor 140 may be configured as typically done, and in some embodiments may be configured, for example, to perform operations associated with a given host LCom-enabled luminaire 100 and one or more of the applications 132 thereof (e.g., within memory 130 or elsewhere). In some cases, memory 130 may be configured to be utilized, for example, for processor workspace (e.g., for one or more processors 140) and/or to store media, programs, applications, and/or content on a host LCom-enabled luminaire 100 on a temporary or permanent basis. In one example embodiment, the memory 130 stores location information that indicates where the luminaire is deployed (for purposes of facilitating navigation, as previously explained), and may further include a look-up table (LUT) or other memory facility that indexes baud rates by computing device type. Table 1 shows an example look-up table according to one such embodiment. Assume that each of A through F represents a transmission baud rate which can be utilized by luminaires 100. Thus, in some cases, a given processor 140 can identify the baud rate at which the luminary 100 should transmit based on received decoding parameters (these parameters may be provided network 300, for example, whether those parameters be high level information such as make and model of the subject computing device 200 or lower level information about that device 200 such as its sensing capability (e.g., camera imaging speed and resolution).

TABLE 1

Baud Rates LUT

| Make | Model | | | | |
|---|---|---|---|---|---|
| | 5S | 6S | Galaxy S6 | Galaxy S5 | Moto X | Moto G |
| Apple Inc | A | B | | | | |
| Samsung | | | C | D | | |
| Motorola | | | | | E | F |

The one or more applications 132 stored in memory 130 can be accessed and executed, for example, by the one or more processors 140 of a given LCom-enabled luminaire 100. In accordance with some embodiments, a given application or module 132 can be implemented in any suitable standard and/or custom/proprietary programming language, such as, for example: (1) C; (2) C++; (3) objective C; (4) JavaScript; and/or (5) any other suitable custom or proprietary instruction sets. In a more general sense, the applications or modules 132 can be instructions encoded on any suitable non-transitory machine-readable medium that, when executed by one or more processors 140, carries out functionality of a given LCom-enabled luminaire 100, in part or in whole. In one example embodiment, at least one of these modules 132 is a routine for determining a baud rate for a given computing device 200, based on decoding parameters received from that device 200. In still other embodiments, the at least one module 132 receives the target baud rate from the computing device 200 or the network 300. In such cases, the baud rate can be dynamically selected for a given computing device 200, and the luminaire can then execute LCom communication using that baud rate. In still other embodiments, the baud rate can be pre-established as a fixed baud rate.

In accordance with some embodiments, the one or more solid-state light sources 110 of a given LCom-enabled luminaire 100 can be electronically controlled, for example, to output light and/or light encoded with LCom data (e.g., an LCom signal). To that end, a given LCom-enabled luminaire 100 may include or otherwise be communicatively coupled with one or more controllers 150. In some such example embodiments, such as that illustrated in FIG. 2A, a controller 150 may be hosted by a given LCom-enabled luminaire 100 and operatively coupled (e.g., via a communication bus/interconnect) with the one or more solid-state light sources 110 (1-N) of that LCom-enabled luminaire 100. In this example case, controller 150 may output a digital control signal to any one or more of the solid-state light sources 110 and may do so, for example, based on wired and/or wireless input received from a given local source (e.g., such as on-board memory 130) and/or remote source (e.g., such as a control interface or network 300). As a result, a given LCom-enabled luminaire 100 may be controlled in such a manner as to output any number of output beams (1-N), which may include light and/or LCom data (e.g., an LCom signal), as desired for a given target application or end-use. However, the present disclosure is not so limited.

For example, in some other embodiments, such as that illustrated in FIG. 2B, a controller 150 may be packaged or otherwise hosted, in part or in whole, by a given solid-state light source 110 of a given LCom-enabled luminaire 100 and operatively coupled (e.g., via a communication bus/interconnect) with the one or more solid-state light sources 110. If LCom-enabled luminaire 100 includes a plurality of such solid-state light sources 110 hosting their own controllers 150, then each such controller 150 may be considered, in a sense, a mini-controller, providing LCom-enabled luminaire 100 with a distributed controller 150. In some embodiments, controller 150 may be populated, for example, on one or more PCBs of the host solid-state light source 110. In this example case, controller 150 may output a digital control signal to an associated solid-state light source 110 of LCom-enabled luminaire 100 and may do so, for example, based on a wired and/or wireless input received from a given local source (e.g., such as on-board memory 130) and/or remote source (e.g., such as a control interface, optional network 300, etc.). As a result, LCom-enabled luminaire 110 may be controlled in such a manner as to output any number of output beams (1-N), which may include light and/or LCom data (e.g., an LCom signal), as desired for a given target application or end-use.

In accordance with some embodiments, a given controller 150 may host one or more lighting control modules and can be programmed or otherwise configured to output one or more control signals, for example, to adjust the operation of the solid-state emitter(s) of a given solid-state light source 110 according to a desired baud rate. For example, in some cases, a given controller 150 may be configured to output a control signal to control whether the light beam of a given solid-state emitter is on/off. In some instances, a given controller 150 may be configured to output a control signal to control the intensity/brightness (e.g., dimming; brightening) of the light emitted by a given solid-state emitter. In some cases, a given controller 150 may be configured to output a control signal to control the color (e.g., mixing; tuning) of the light emitted by a given solid-state emitter. Thus, if a given solid-state light source 110 includes two or more solid-state emitters configured to emit light having different wavelengths, the control signal may be used to adjust the relative brightness of the different solid-state emitters in order to change the mixed color output by that solid-state light source 110. In some embodiments, controller 150 may be configured to output a control signal to encoder 172 (discussed below) to facilitate encoding of LCom data for transmission by a given LCom-enabled luminaire 100. In some embodiments, controller 150 may be configured to output a control signal to modulator 174 (discussed below) to facilitate modulation of an LCom signal for transmission by a given LCom-enabled luminaire 100. Other suitable configurations and control signal output for a given controller 150 of a given LCom-enabled luminaire 100 will depend on a given application and will be apparent in light of this disclosure.

In accordance with some embodiments, a given LCom-enabled luminaire 100 may include an encoder 172. In some embodiments, encoder 172 may be configured, for example, to encode LCom data in preparation for transmission thereof by the host LCom-enabled luminaire 100. To that end, encoder 172 may be provided with any suitable configuration, as will be apparent in light of this disclosure.

In accordance with some embodiments, a given LCom-enabled luminaire 100 may include a modulator 174. In some embodiments, modulator 174 may be configured, for example, to modulate an LCom signal in preparation for transmission thereof by the host LCom-enabled luminaire 100. In some embodiments, modulator 174 may be a single-channel or multi-channel electronic driver (e.g., driver 120) configured, for example, for use in controlling the output of the one or more solid-state emitters of a given solid-state light source 110. In some embodiments, modulator 174 may be configured to control the on/off state, dimming level, color of emissions, correlated color temperature (CCT), and/or color saturation of a given solid-state emitter (or grouping of emitters). To such ends, modulator 174 may utilize any of a wide range of driving techniques, including, for example: (1) a pulse-width modulation (PWM) dimming protocol; (2) a current dimming protocol; (3) a triode for alternating current (TRIAC) dimming protocol; (4) a constant current reduction (CCR) dimming protocol; (5) a pulse-frequency modulation (PFM) dimming protocol; (6) a pulse-code modulation (PCM) dimming protocol; (7) a line voltage (mains) dimming protocol (e.g., dimmer is connected before input of modulator 174 to adjust AC voltage to modulator 174); and/or (8) any other suitable lighting control/driving technique, as will be apparent in light of this disclosure. Other suitable configurations and control/driving techniques for modulator 174 will depend on a given application and will be apparent in light of this disclosure.

In accordance with some embodiments, a given LCom-enabled luminaire 100 may include a multiplier 176. Multiplier 176 may be configured as typically done, and in some example embodiments may be configured to combine an input received from an upstream modulator 174 with an input received from an ambient light sensor 165 (discussed below). In some instances, multiplier 176 may be configured to increase and/or decrease the amplitude of a signal passing therethrough, as desired. Other suitable configurations for multiplier 176 will depend on a given application and will be apparent in light of this disclosure. In accordance with some embodiments, a given LCom-enabled luminaire 100 may include an adder 178. Adder 178 may be configured as typically done, and in some example embodiments may be configured to combine an input received from an upstream multiplier 178 with a DC level input. In some instances, adder 178 may be configured to increase and/or decrease the amplitude of a signal passing therethrough, as desired. Other suitable configurations for adder 178 will depend on a given application and will be apparent in light of this disclosure.

In accordance with some embodiments, a given LCom-enabled luminaire 100 may include a digital-to-analog converter (DAC) 180. DAC 180 may be configured as typically done, and in some example embodiments may be configured to convert a digital control signal into an analog control signal to be applied to a given solid-state light source 110 of the host LCom-enabled luminaire 100 to output an LCom signal therefrom. Note that DAC 180 may further be integrated into controller 150, in some embodiments. Other suitable configurations will be apparent in light of this disclosure.

In accordance with some embodiments, a given LCom-enabled luminaire 100 may include one or more sensors 160. In some embodiments, a given LCom-enabled luminaire 100 optionally may include an altimeter 161. When included, altimeter 161 may be configured as typically done, and in some example embodiments may be configured to aid in determining the altitude of a host LCom-enabled luminaire 100 with respect to a given fixed level (e.g., a floor, a wall, the ground, or other surface). In some embodiments, a given LCom-enabled luminaire 100 optionally may include a geomagnetic sensor 163. When included, geomagnetic sensor 163 may be configured as typically done, and in some example embodiments may be configured to determine the orientation and/or movement of a host LCom-enabled luminaire 100 relative to a geomagnetic pole (e.g., geomagnetic north) or other desired heading, which may be customized as desired for a given target application or end-use. In some embodiments, a given LCom-enabled luminaire 100 optionally may include an ambient light sensor 165. When included, ambient light sensor 165 may be configured as typically done, and in some example embodiments may be configured to detect and measure ambient light levels in the surrounding environment of the host LCom-enabled luminaire 100. In some cases, ambient light sensor 165 may be configured to output a signal, for example, to a multiplier 176 of LCom-enabled luminaire 100. In some embodiments, a given LCom-enabled luminaire 100 optionally may include a gyroscopic sensor 167. When included, gyroscopic sensor 167 may be configured as typically done, and in some example embodiments may be configured to determine the orientation (e.g., roll, pitch, and/or yaw) of the host LCom-enabled luminaire 100. In some embodiments, a given LCom-enabled luminaire 100 optionally may include an accelerometer 169. When included, accelerometer 169 may be configured as typically done, and in some example embodiments may be configured to detect motion of the host LCom-enabled luminaire 100. In any case, a given sensor 160 of a given host LCom-enabled luminaire 100 may include mechanical and/or solid-state componentry, as desired for a given target application or end-use. Also, it should be noted that the present disclosure is not so limited only to these example optional sensors 160, as additional and/or different sensors 160 may be provided as desired for a given target application or end-use, in accordance with some other embodiments, or no sensors 160 may be provided, as the case may be. Numerous configurations will be apparent in light of this disclosure.

In accordance with some embodiments, a given LCom-enabled luminaire 100 may include a communication module 170, which may be configured for wired (e.g., Universal Serial Bus or USB, Ethernet, FireWire, etc.) and/or wireless (e.g., Wi-Fi, Bluetooth, etc.) communication, as desired. In accordance with some embodiments, communication module 170 may be configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol; and/or (6) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication module 170, as desired for a given target application or end-use. In some instances, communication module 170 may be configured to facilitate inter-luminaire communication between LCom-enabled luminaires 100. In addition or alternatively, communication module 170 may be configured so as to allow for receipt of information from network 300, such as decoding parameters associated with the computing device 200, or a pre-computed baud rate. As explained herein, the decoding parameters associated with the computing device 200 can be used by the luminaire to compute a baud rate suitable for a given computing device 200. Whether the baud rate is computed in real time at the luminaire or received from somewhere else or otherwise provided, the baud rate can then be used to generate the LCom signals emitted by that luminaire 100. The communication module 170 may be configured to use any suitable wired and/or wireless transmission technologies (e.g., radio frequency, or RF, transmission; infrared, or IR, light modulation; etc.), as desired for a given target application or end-use. Other suitable configurations for communication module 170 will depend on a given application and will be apparent in light of this disclosure.

Figure 3:
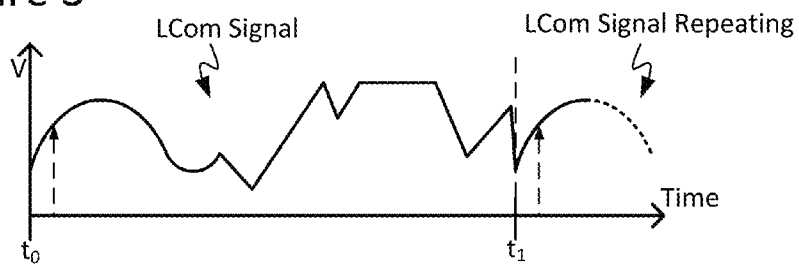
FIG. 3 illustrates an example arbitrary LCom signal as may be transmitted by an LCom-enabled luminaire, in accordance with an embodiment of the present disclosure.

As previously noted, a given LCom-enabled luminaire 100 may be configured, in accordance with some embodiments, to output light and/or light encoded with LCom data (e.g., an LCom signal). FIG. 3 illustrates an example arbitrary LCom signal as may be transmitted by an LCom-enabled luminaire 100, in accordance with an embodiment of the present disclosure. As can be seen here, LCom-enabled luminaire 100 may be configured to transmit a given LCom signal at a given baud rate over a given time interval $(t_1-t_0)$. In some cases, a given LCom-enabled luminaire 100 may be configured to repeatedly output its one or more LCom signals. In any case, the baud rate may be customized, as desired for a given target application or end-use.

Figure 4:
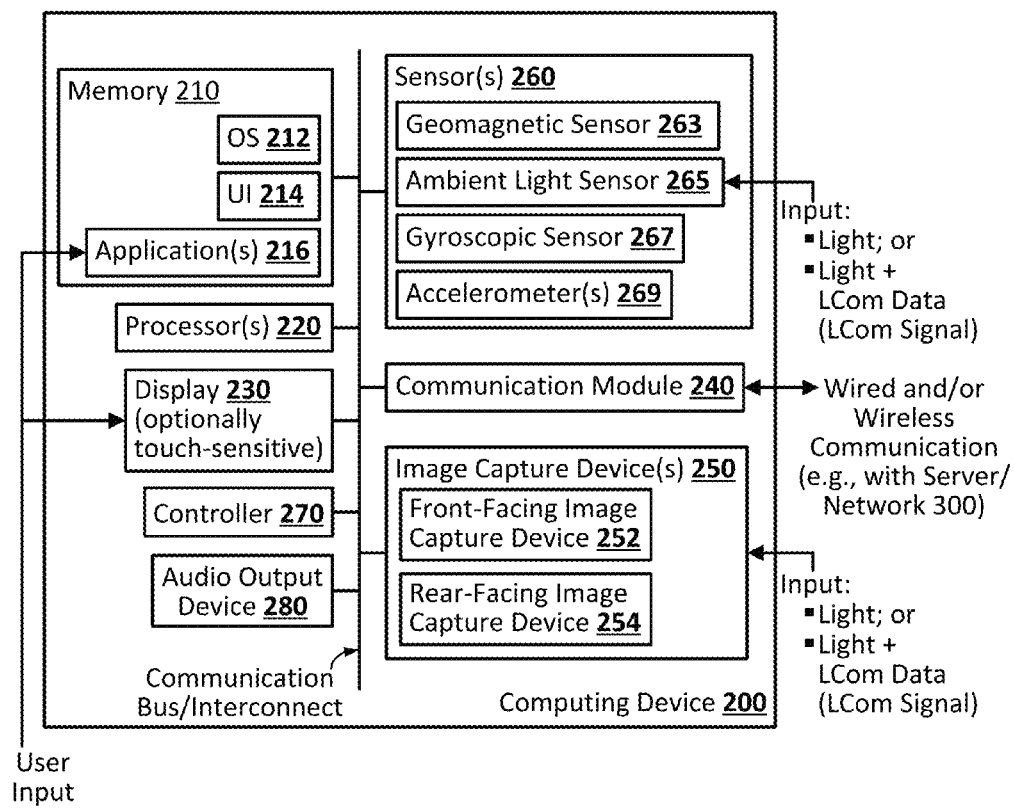
FIG. 4 illustrates an example computing device configured in accordance with an embodiment of the present disclosure.

FIG. 4 illustrates an example computing device 200 configured in accordance with an embodiment of the present disclosure. As discussed herein, computing device 200 may be configured, in accordance with some embodiments: (1) to detect the light pulses of an LCom signal emitted by a transmitting LCom-enabled luminaire 100; and (2) to decode the LCom data from a detected LCom signal. To these ends, computing device 200 can be any of a wide range of computing platforms, mobile or otherwise. For example, in accordance with some embodiments, computing device 200 can be, in part or in whole: (1) a laptop/notebook computer or sub-notebook computer; (2) a tablet or phablet computer; (3) a mobile phone or smartphone; (4) a personal digital assistant (PDA); (5) a portable media player (PMP); (6) a cellular handset; (7) a handheld gaming device; (8) a gaming platform; (9) a desktop computer; (10) a television set; (11) a wearable or otherwise body-borne computing device, such as a smartwatch, smart glasses, or smart headgear; and/or (12) a combination of any one or more thereof. Other suitable configurations for computing device 200 will depend on a given application and will be apparent in light of this disclosure.

As can be further seen from FIG. 4, computing device 200 may include memory 210 and one or more processors 220. Memory 210 can be of any suitable type (e.g., RAM and/or ROM, or other suitable memory) and size, and in some cases may be implemented with volatile memory, non-volatile memory, or a combination thereof. A given processor 220 of computing device 200 may be configured as typically done, and in some embodiments may be configured, for example, to perform operations associated with computing device 200 and one or more of the modules thereof (e.g., within memory 210 or elsewhere). In some cases, memory 210 may be configured to be utilized, for example, for processor workspace (e.g., for one or more processors 220) and/or to store media, programs, applications, and/or content on computing device 200 on a temporary or permanent basis. The one or more modules stored in memory 210 (e.g., such as OS 212, UI 214, and/or one or more applications 216) can be accessed and executed, for example, by the one or more processors 220 of computing device 200. Just as explained with respect to memory 130 of the luminaires 100, memory 210 of the device 200 may include information that can be used to compute or otherwise set baud rate, whether it be pre-computed or otherwise pre-established baud rates themselves or decoding parameters can that can be used to determine an appropriate baud rate for a given receiving device 200. In some cases, memory 210 includes an LUT or other memory facility that indexes baud rates by computing device type, as previously discussed with respect to Table 1. Alternatively, memory 210 may include one or more files that contain decoding parameters that can be recalled or otherwise interrogated to inform the baud rate computing process, as will be appreciated in light of this disclosure. In still other embodiments, the baud rate is a fixed, pre-established parameter that is determined by the luminaire 100. In such cases, the receiving device 200 effectively is tasked with decoding LCom messages, regardless of the given baud rate. To this end, the receiving device 200 is configured with a sub-sampling raster line process that is agnostic with respect to the given baud rate, in accordance with some embodiments.

OS 212 can be implemented with any suitable OS, mobile or otherwise, such as, for example: (1) Android OS from Google, Inc.; (2) iOS from Apple, Inc.; (3) BlackBerry OS from BlackBerry Ltd.; (4) Windows Phone OS from Microsoft Corp; (5) Palm OS/Garnet OS from Palm, Inc.; (6) an open source OS, such as Symbian OS; and/or (7) a combination of any one or more thereof. As will be appreciated in light of this disclosure, OS 212 may be configured, for example, to aid in processing LCom data during its flow through computing device 200. Other suitable configurations and capabilities for OS 212 will depend on a given application and will be apparent in light of this disclosure. A user interface (UI) module 214 is provided as commonly done, and generally allows for user interaction with the device 200 (e.g., such as a graphical touched-based UI on various smartphones and tablets). Any number of user interface schemes can be used.

In accordance with some embodiments, memory 210 may have stored therein (or otherwise have access to) one or more applications 216. In some instances, computing device 200 may be configured to receive input, for example, via one or more applications 216 stored in memory 210 (e.g., such as an indoor navigation application). In accordance with some embodiments, a given application or module 216 can be implemented in any suitable standard and/or custom/proprietary programming language, such as, for example: (1) C; (2) C++; (3) objective C; (4) JavaScript; and/or (5) any other suitable custom or proprietary instruction sets. In a more general sense, the applications or modules 216 can be instructions encoded on any suitable non-transitory machine-readable medium that, when executed by one or more processors 220, carries out functionality of a given computing device 200, in part or in whole. In one example embodiment, at least one of these modules 216 is a routine programmed or otherwise configured to provide decoding parameters of computing device 200 to luminaire 100, so that luminaire 100 can determine a baud rate suitable for the device 200. In still other embodiments, the at least one module 216 may be configured to compute the target baud rate itself and provide that baud rate to the luminaire 100, either directly via network 300 or indirectly via a computer system 301. In any case, the baud rate can be dynamically selected for a given computing device 200, and the luminaire can then execute LCom communication with that device 200 using that baud rate, according to some embodiments. In addition, at least one module 216 may be further configured to also monitor the luminaire for any changes (orientation, with respect to computing device 200), and to update the baud rate computation periodically (and pass any changes along to the luminaire 100). Likewise, in some embodiments, the at least one module 216 may be further configured to optionally try to adjust its own settings to optimize decoding in effort to deal with situations where control by luminaire 100 is not available, for whatever reason. In still other embodiments, the baud rate is pre-established or otherwise fixed, such that there is no need for baud rate determination. The at least one module 216 may be further configured to receive LCom signals and decode those signals. As will be appreciated in light of this disclosure, the decoding process may include a dominant or supplementary sub-sampling raster line process as provided herein to support increased sampling rates and lower error rate decoding of LCom data packets, as previously explained.

As can be seen further from FIG. 4, computing device 200 may include a display 230, in accordance with some embodiments. Display 230 can be any electronic visual display or other device configured to display or otherwise generate an image (e.g., image, video, text, and/or other displayable content) there at. In some instances, display 230 may be integrated, in part or in whole, with computing device 200, whereas in some other instances, display 230 may be a stand-alone component configured to communicate with computing device 200 using any suitable wired and/or wireless communications means. In some cases, display 230 optionally may be a touchscreen display or other touch-sensitive display. To that end, display 230 may utilize any of a wide range of touch-sensing techniques, such as, for example: (1) resistive touch-sensing; (2) capacitive touch-sensing; (3) surface acoustic wave (SAW) touch-sensing; (4) infrared (IR) touch-sensing; (5) optical imaging touch-sensing; and/or (6) a combination of any one or more thereof. In a more general sense, and in accordance with some embodiments, an optionally touch-sensitive display 230 generally may be configured to detect or otherwise sense direct and/or proximate contact from a user's finger, stylus, or other suitable implement at a given location of that display 230. In some cases, an optionally touch-sensitive display 230 may be configured to translate such contact into an electronic signal that can be processed by computing device 200 (e.g., by the one or more processors 220 thereof) and manipulated or otherwise used to trigger a given GUI action. In some cases, a touch-sensitive display 230 may facilitate user interaction with computing device 200 via the GUI 214 presented by such display 230. Numerous suitable configurations for display 230 will be apparent in light of this disclosure.

In accordance with some embodiments, computing device 200 may include a communication module 240, which may be configured for wired (e.g., Universal Serial Bus or USB, Ethernet, FireWire, etc.) and/or wireless (e.g., Wi-Fi, Bluetooth, etc.) communication using any suitable wired and/or wireless transmission technologies (e.g., radio frequency, or RF, transmission; infrared, or IR, light modulation; etc.), as desired. In accordance with some embodiments, communication module 240 may be configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol; (6) a near field communication (NFC) protocol; (7) a local area network (LAN)-based communication protocol; (8) a cellular-based communication protocol; (9) an Internet-based communication protocol; (10) a satellite-based communication protocol; and/or (11) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication module 240, as desired for a given target application or end-use. In some instances, communication module 240 may be configured to communicate with one or more LCom-enabled luminaires 100 via network 300. Numerous suitable configurations for communication module 240 will depend on a given application and will be apparent in light of this disclosure.

Also, as can be seen from FIG. 4, computing device 200 may include one or more image capture devices 250, such as a front-facing image capture device 252 and/or a rear-facing image capture device 254, in accordance with some embodiments. For consistency and ease of understanding of the present disclosure, front-facing image capture device 252 and rear-facing image capture device 254 hereinafter may be collectively referred to generally as an image capture device 250, except where separately referenced. A given image capture device 250 can be any device configured to capture digital raster images, such as a camera (e.g., a digital camera configured to capture photographs) or a video camera (e.g., a camera configured to capture moving images comprising a plurality of frames). In some cases, a given image capture device 250 may include typical components such as, for instance, an optics assembly, an image sensor, and/or an image/video encoder, and may be integrated, in part or in whole, with computing device 200. A given image capture device 250 can be configured to operate using light, for example, in the visible spectrum and/or other portions of the electromagnetic spectrum not limited to the infrared (IR) spectrum, ultraviolet (UV) spectrum, etc. In some instances, a given image capture device 250 may be configured to continuously acquire imaging data. As described herein, a given image capture device 250 of computing device 200 may be configured, in accordance with some embodiments, to detect the light and/or LCom signal output of a transmitting LCom-enabled luminaire 100. In some instances, a given image capture device 250 may be, for example, a camera like one typically found in smartphones or other mobile computing devices. In a more general sense, and as will be appreciated, image capture devices 250 can be any suitable image capture technology that can capture light, whether visible or not, in a pixelated raster-like fashion such as devices including semiconductor charge-coupled devices (CCD) sensors or active pixel sensors in complementary metal oxide semiconductor (CMOS).

As previously explained with respect to FIGS. 6A and 6B, the ability of a computing device 200 to decode an LCom signal is generally limited by the raster line frequency of that device's camera. To this end, assume that image capture device 250 is associated with an array of sensors, each sensor corresponding to a pixel, each pixels corresponding to a raster line. Further assume that the image capture device 250 can operate in a rolling shutter mode (which in actuality is likely an overlapping rolling shutter mode). A typical example image capture device 250 is 4-megapixel (MP) camera running at a frame rate of 30 fps. Other fixed parameters include frame resolution and raster line timings, such as 1334×750 pixels and 60 overlapping raster lines. This means the effective sampling rate is [750 raster lines]*[30 fps]/[60 overlapping raster lines per frame]=375 Hz.

Numerous other suitable configurations for a given image capture device 250 (e.g., front-facing image capture device 252; rear-facing image capture device 254) of computing device 200 will depend on a given application and will be apparent in light of this disclosure.

In accordance with some embodiments, computing device 200 may include one or more sensors 260. In some embodiments, computing device 200 optionally may include a geomagnetic sensor 263. When included, geomagnetic sensor 263 may be configured as typically done, and in some example embodiments may be configured to determine the orientation and/or movement of a host computing device 200 relative to a geomagnetic pole (e.g., geomagnetic north) or other desired heading, which may be customized as desired for a given target application or end-use. In some embodiments, computing device 200 optionally may include an ambient light sensor 265. When included, ambient light sensor 265 may be configured as typically done, and in some example embodiments may be configured to detect and measure ambient light levels in the surrounding environment of the host computing device 200. In some embodiments, computing device 200 optionally may include a gyroscopic sensor 267. When included, gyroscopic sensor 267 may be configured as typically done, and in some example embodiments may be configured to determine the orientation (e.g., roll, pitch, and/or yaw) of the host computing device 200. In some embodiments, computing device 200 optionally may include an accelerometer 269. When included, accelerometer 269 may be configured as typically done, and in some example embodiments may be configured to detect motion of the host computing device 200. In any case, a given sensor 260 of a given host computing device 200 may include mechanical and/or solid-state componentry, as desired for a given target application or end-use. Also, it should be noted that the present disclosure is not so limited only to these example optional sensors 260, as additional and/or different sensors 260 may be provided, as desired for a given target application or end-use, in accordance with some other embodiments. Numerous sensor configurations for device 200 will be apparent in light of this disclosure.

In accordance with some embodiments, computing device 200 may include or otherwise be communicatively coupled with one or more controllers 270. A given controller 270 may be configured to output one or more control signals to control any one or more of the various components/modules of computing device 200 and may do so, for example, based on wired and/or wireless input received from a given local source (e.g., such as on-board memory 210) and/or remote source (e.g., such as a control interface, optional network 300, etc.). In accordance with some embodiments, a given controller 270 may host one or more control modules and can be programmed or otherwise configured to output one or more control signals, for example, to adjust the operation of a given portion of computing device 200. For example, in some cases, a given controller 270 may be configured to output a control signal to control operation of a given image capture device 250, and/or to output a control signal to control operation of one or more sensors 260. Numerous other configurations and control signal output for a given controller 270 of computing device 200 will depend on a given application and will be apparent in light of this disclosure.

As can be seen further from FIG. 4, computing device 200 may include an audio output device 280, in accordance with some embodiments. Audio output device 280 can be, for example, a speaker or any other device capable of producing sound from an audio data signal, in accordance with some embodiments. Audio output device 280 can be configured, for example, to reproduce sounds local to and/or received by its host computing device 200. In some instances, audio output device 280 may be integrated, in part or in whole, with computing device 200, whereas in some other instances, audio output device 280 may be a stand-alone component configured to communicate with computing device 200 using any suitable wired and/or wireless communications means, as desired. Numerous other suitable types and configurations for audio output device 280 will depend on a given application and will be apparent in light of this disclosure.

Network 300 can be any suitable public and/or private communications network. For instance, in some cases, network 300 may be a private local area network (LAN) operatively coupled to a wide area network (WAN), such as the Internet. In some cases, network 300 may include one or more second-generation (2G), third-generation (3G), and/or fourth-generation (4G) mobile communication technologies. In some cases, network 300 may include a wireless local area network (WLAN) (e.g., Wi-Fi wireless data communication technologies). In some instances, network 300 may include Bluetooth wireless data communication technologies. In some cases, network 300 may include supporting infrastructure and/or functionalities, such as a server and a service provider (e.g., computer system 301), but such features are not necessary to carry out communication via network 300. In some instances, computing device 200 may be configured for communicative coupling, for example, with a network 300 and one or more LCom-enabled luminaires 100. In some cases, computing device 200 may be configured to receive data from network 300, for example, which serves to supplement LCom data received by computing device 200 from a given LCom-enabled luminaire 100. In some instances, computing device 200 may be configured to receive data (e.g., such as position, ID, baud rate, and/or other data pertaining to a given LCom-enabled luminaire 100) from network 300 that facilitates indoor navigation via one or more LCom-enabled luminaires 100. In some cases, network 300 may include or otherwise have access to one or more lookup tables of data that may be accessed by a computing device 200 communicatively coupled therewith, for purposes of determining an appropriate baud rate, for instance. Numerous configurations for network 300 will be apparent in light of this disclosure.

As previously noted, there are a number of non-trivial challenges associated with modulating data over light and transmitting it into space for LCom. For example, to prevent or otherwise minimize visual artifacts and other perceivable changes in light output, it may be desirable to have the LCom light source transmit at a sufficiently high speed. However, effective detection of the modulated light by a given receiver device depends on whether that device has sufficient reception capabilities. Currently available smartphone cameras typically have a maximum frame rate of 30 frames/second (FPS) or 60 FPS, providing only very limited low-speed reception capabilities. As such, there is currently no known way to effectively utilize existing smartphone camera hardware in obtaining data modulated over light without either: (1) making a change in the transmitted light output, which would be perceivable to the user and any bystanders; or (2) adding costly, specialized receiver hardware to the receiver device.

Thus, and in accordance with some embodiments, techniques are disclosed for sampling LCom data in a manner that allows for detection thereof via an image capture device 250 such as, for example, a standard low-speed smartphone camera having a frame rate of 30 FPS. In some cases, the disclosed techniques can be used, for example, in decoding LCom data in a manner that: (1) prevents or otherwise minimizes perceivable flicker of the light output by a transmitting LCom-enabled luminaire 100; and/or (2) avoids or otherwise reduces a need for additional, specialized receiver hardware at computing device 200. In some cases, the disclosed techniques can be used, for example, to enhance the sampling rate at the receiving computing device 200. For instance, if the image capture device 250 is a typical smartphone front-facing camera configured to capture images at 30 FPS at VGA resolution (640×480 pixels), and if a standard RGB color profile is utilized, then each frame captured by that image capture device 250 is about 900 KB of image data (640 pixels×480 pixels×3 colors). Thus, at a frame rate of 30 FPS, that image capture device 250 may capture about 27 MB of raw image data each second, in accordance with an example embodiment. In other embodiments, the resolution of the image capture device 250 may be different (e.g., 1334×750 pixels, or other standard frame resolutions, including high definition resolutions).

Figure 5A:
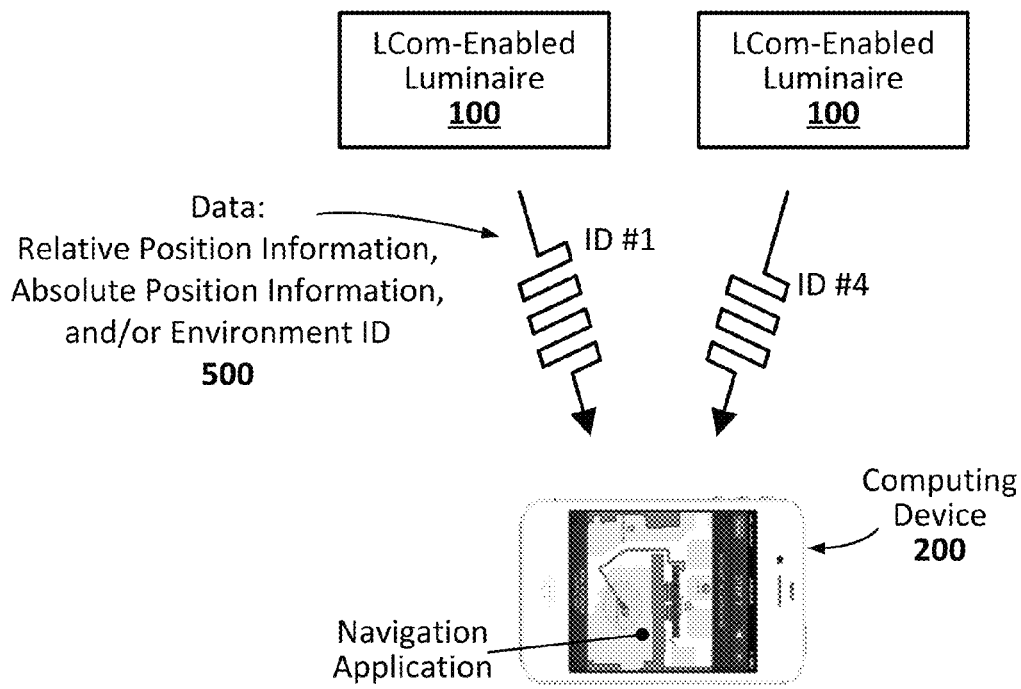
FIG. 5A illustrates an example LCom system, including an LCom-enabled luminaire and a computing device, in accordance with an embodiment of the present disclosure.

FIG. 5A illustrates an example LCom system, including an LCom-enabled luminaire and a computing device, in accordance with an embodiment of the present disclosure. As can be seen, this example scenario includes two luminaires 100 each communicating with a computing device 200, which happens to be a smartphone running an LCom-based navigation application. The navigation application can be, for instance, one of the applications 216 stored in memory 210 and executed by processor(s) 220. As can be further seen, the LCom signals being communicated include data 500, which generally includes position information, which may be used to navigate. For instance, if the user is receiving light from a specific luminaire 100 that has a known location, then the navigation application 'knows' where the user is and can continue to guide the user along the targeted path.

The position information 500 transmitted by the luminaires 100 may come in any number of forms. For instance, in some embodiments, the luminaire positions may be communicated as a relative position (e.g., relative to another luminaire 100, or some other object having a known position), and/or as an absolute position (e.g., x-y coordinates of a grid-based map). In still other embodiments, the luminaire positions may be communicated as an environment ID, wherein the transmitted ID translates to a specific location on a given map of the environment being navigated. In some such example cases, for instance, a luminaire might use dual tone multi frequency (DTMF) encoding, which means it continuously sends two unique frequencies.

Figure 5B:
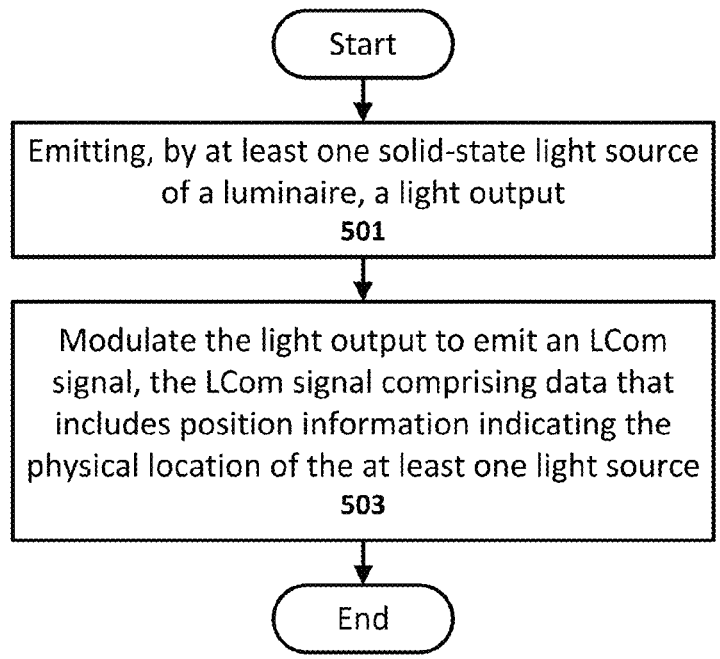
FIG. 5B illustrates an example method for emitting position information from an LCom-enabled luminaire, in accordance with an embodiment of the present disclosure.
Figure 5C:
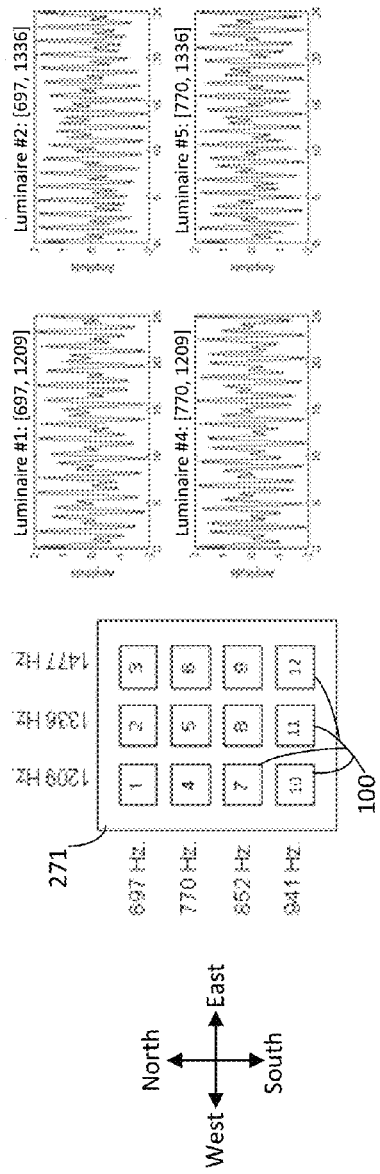
FIG. 5C illustrates an example graphical map of LCom-enabled luminaires deployed in a given venue, and corresponding LCom transmissions indicating the location of that particular luminaire within the venue, in accordance with an embodiment of the present disclosure.

FIG. 5C shows how an example DTMF-based ID system might work. As can be seen, a given environment 271 is the area being navigated and has a number of LCom-enabled luminaires 101. The environment 271 may be, for example, a super market or retail store, or a shopping mall, or a parking garage, or a large office space, to name a few examples. The environment 271 is effectively divided into a grid of physical locations, each location being associated with at least one luminaire 100. As can be further seen, each luminaire 100 is associated with two unique frequencies that it can transmit on a regular basis. The two unique frequencies can thus be used to correlate that particular luminaire's location to a specific location within the environment. For instance, if the user is receiving light from luminaire #1 (which transmits 697 Hz and 1209 Hz in this example embodiment), then the navigation application 'knows' that the user is in the North-West corner of the environment 271; similarly, if the user is receiving light from luminaire #12 (which transmits 941 Hz and 1477 Hz in this example embodiment), then the navigation application 'knows' that the user is in the South-East corner of the environment; and so on. So, in one example scenario, assuming that environment 271 is a store selling goods of some kind, each location can be associated with a specific product or range of products. Thus, a user can be led to a given product location by the navigation application, according to some embodiments. Note that the entire frequency-based grid can be scaled to higher or lower frequencies and still operate as described here to uniquely identify the location of individual luminaires 100.

FIG. 5B illustrates an example method for emitting position information from an LCom-enabled luminaire, in accordance with an embodiment of the present disclosure. As can be seen, the method includes emitting 501, by at least one solid-state light source of a luminaire, a light output. The method further includes modulating 503 the light output to emit an LCom signal, the LCom signal comprising data that includes position information indicating the physical location of the at least one light source. This position information may indicate that particular luminaire's location directly by virtue of relative or absolute position information, or indirectly by virtue of an environment ID that translates to a specific location on a given map of the environment being navigated, as previously explained. Numerous variations on using luminaires having known locations within a given area to be navigated will be apparent in light of this disclosure.

Figure 5D:
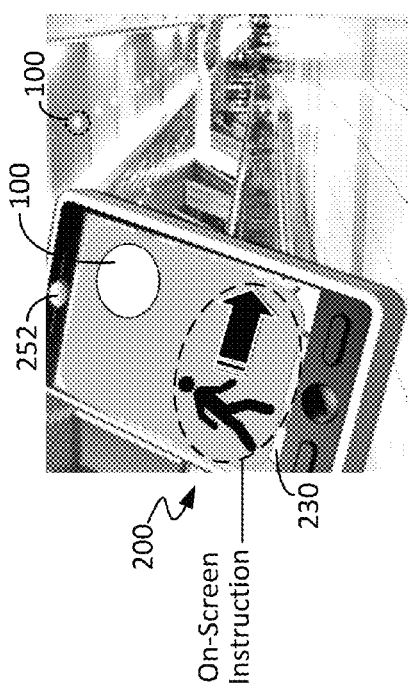
FIG. 5D illustrates an example scenario in which a computing device is configured to output instruction by way of visual feedback to a user, in accordance with an embodiment of the present disclosure.

FIG. 5D illustrates an example scenario in which a computing device 200 receiving LCom signals from luminaries 100 and is configured to output a navigational instruction by way of visual feedback to a user, in accordance with an embodiment of the present disclosure. Note how the actual luminaire 100 in the physical space being navigated is being imaged by way of camera 252, and the resulting image of that luminaire 100 is provided on the display 230 of the device 200. Based on receiving LCom signals from that luminaire 100 (which indicate the position of that luminaire 100), the navigation application continues to guide the user with a visual cue (an arrow in this example case). As the user progresses down the passageway, each subsequent luminaire 100 that is similarly imaged and processed by the device 200 allows the navigational guidance to continue, until the user arrives at the luminaire associated with the user's intended destination.

Adaptive Baud Rate Methodology

Figure 7:
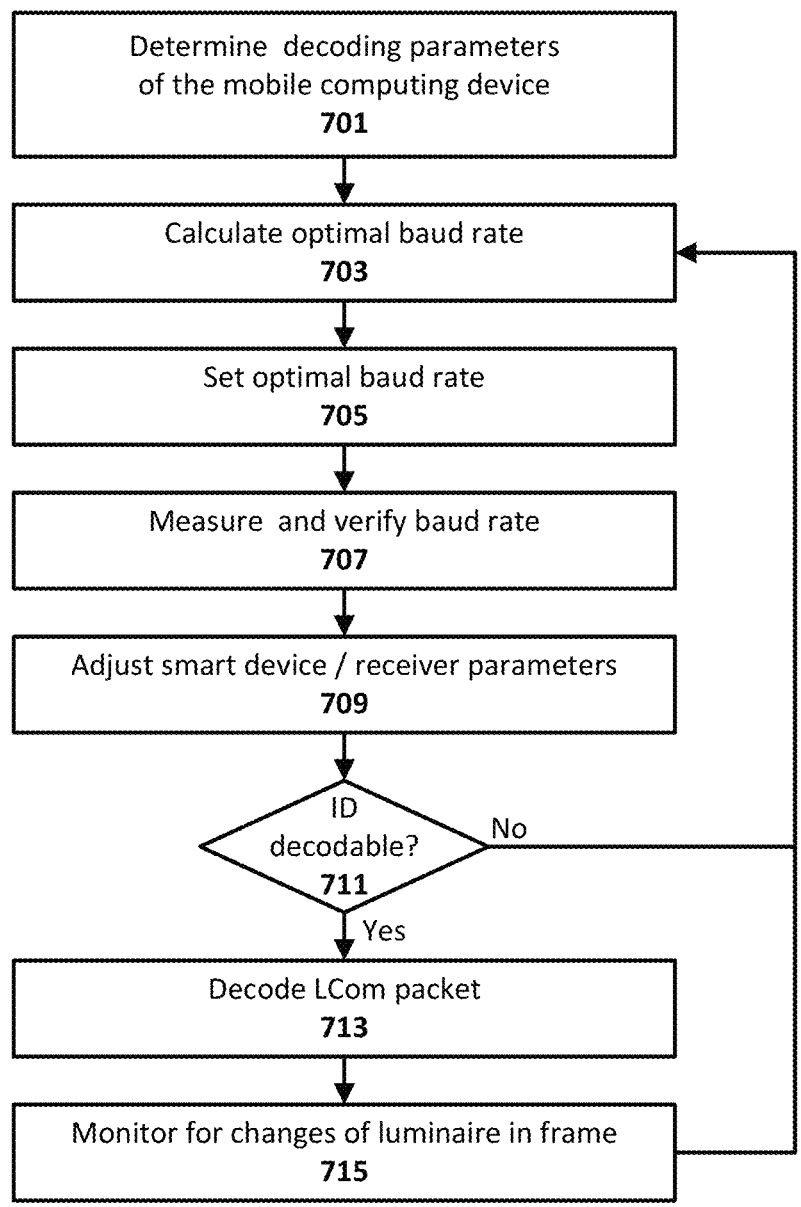
FIG. 7 is a flow chart illustrating a method for setting a baud rate for LCom communication, in accordance with an embodiment of the present disclosure.

FIG. 7 is a flow chart illustrating a method for setting a baud rate for LCom communication, in accordance with an embodiment of the present disclosure. The method may be carried out, for example, by an application executing on the receiving device 200, such as one the applications 216 stored in memory 210 and executable by one or more processors 220. In other embodiments, some parts of the method may be carried out elsewhere, as such as at the luminaire 100 and/or at a remote computer system 300. In any such cases, a baud rate can be selected for a given receiving device 200, and that baud rate can then be used by the luminaire(s) 100 which that device 200 is imaging. A given system might include, for example, 1,000 luminaires in a store that are all transmitting their ID's through LCom-based signaling. At any one spot in the store, a user with a smartphone or other receiver device may only see one to three luminaires in one camera frame. As the user moves, the number of luminaires and size varies in each camera frame. According to an example embodiment of the present disclosure, the smartphone is configured to set the baud rate of the transmitting luminaire in such a way that decoding the transmitted ID is reliable.

As can be seen, the method includes determining 701 the various decoding parameters of the mobile computing. The may be accomplished in various ways. For instance, most operating systems allow for hardware profiles of its various componentry, including cameras and other sensors, to be recalled or otherwise queried from a local storage of the device 200 such that fixed decoding parameters of that componentry is known. One example would be a navigation app running on iOS operating system indicating that the hardware is an iPhone 6 with a 4-MP camera running at a shutter speed of 1/60 second. Other fixed parameters include frame resolution and raster line timings such as 1334×750 pixels and 16 overlapping raster lines. For comparison, the Galaxy S5 Android phone has an 8-MP camera running at a shutter speed of 1/30 seconds. In other embodiments, a decoding parameter database can be populated (offline) with the relevant parameters of currently available computing devices, and that database can be queried for decoding parameters associated with a given computing device (based on make and model). Alternatively, the user of the given device 200 can be queried to manually enter various decoding parameters of interest (e.g., pixels, shutter speed, frame resolution, number of overlapping raster lines, and processor speed).

Once the decoding parameters are in hand, the method continues with calculating 703 a baud rate suitable for the given computing device. As will be appreciated, using the receiving device 200 specifications, an optimal baud can be rate computed so as to allow the device 200 to receive LCom signals in some desired percentage of the frame, such as 40% to 50%, or more. In more detail, assume a receiving device 200 having a 4 MP camera running at a shutter speed of 1/60 second, as well as a frame resolution and raster line timings of 1334×750 pixels and 16 overlapping raster lines. Thus, the effective sampling rate can be computed as follows: 750 raster lines per 1/60 second=45 k raster lines/ second. Now, further assume that it is desired to have 10 raster lines per bit, which means initially that the baud rate should be 4.5 kHz (=45 k/10).

With the baud rate calculated, the method continues with setting 705 the baud rate at the luminaire. Continuing with the above example case, setting the baud rate would entail setting the luminaire baud rate to 4.5 KHz or bps (bits per second). So, for example, this baud rate can be implemented by the controller 150, which controls the on-off state of the light sources 110. In the case of multiple smart devices in the same area, the baud rate can be set for the lowest common denominator (i.e., the device 200 having the lowest baud rate), according to some embodiments. The luminaire can then start to transmit LCom signals at that baud rate. For embodiments where the baud rate determination at 705 is made external to the luminaire, the method may include, for example, passing the baud rate to the luminaire through a back channel such as Bluetooth or WiFi (such as via network 300).

The method continues with measuring 707 and verifying the baud rate at the receiving device 200. In some such embodiments, this can be done by measuring the luminaire length in raster lines. In more detail, and continuing with the above example where the LCom message is 32 bits long and there are 10 raster lines per bit, which means at least 320 raster lines are needed to "see" the entire message at any one time in a single 750 raster line frame. Further assume a shutter speed of 1/60 second, thereby providing 45 k raster lines per second. With these parameters in mind, note that the camera frame data of the computing device 200 can be used to measure the length of luminaire 100 in units of raster lines. If the entire luminaire 100 covers more than 320 raster lines within a given frame, then it follows that the entire LCom message (which covers 320 raster lines) can be seen as well, within that given frame. As a corollary, if the entire luminaire 100 covers less than 320 raster lines within a given frame, then it further follows that the entire LCom message (which needs 320 raster lines) cannot all be received or "seen" within that single frame.

For instance, in the example scenario shown in FIG. 8, T refers to the total number of raster lines making up one camera frame for device 200 (assume T equals 750 raster lines, in the example case), and L refers to the length (in raster lines) of the luminaire 100 being imaged in the camera frame currently displayed (assume L equals 400 raster lines, in this example case). Thus, the LCom message being broadcast by the imaged luminaire 100 can be captured in a single camera frame. However, if the imaged luminaire 100 was less than 320 raster lines, then the LCom message being broadcast by the imaged luminaire 100 will not be complete for that baud rate. In this case, therefore, the baud rate could be increased which sacrifices resolution to obtain the entire message or ID spread out over the luminaire. Thus, for instance, the 10 raster lines per bit can be changed to 5 raster lines per bit, thereby doubling the baud rate from 4.5 Kbits/sec to 9 Kbits/sec. FIG. 9 shows a visual of different baud rates, including a relatively fast baud rate showing four messages within a given time period, and a relatively slow baud rate showing two messages within that same given time period. Thus, the fast baud rate is twice as fast as the slow baud rate. Because the faster baud rate is more compressed in time, it can be imaged with fewer raster lines.

The method continues with adjusting 709 the receiving device parameters, if needed. In the case where the luminaire is either controlled by some other device or the baud rate is not settable, then the receiving device itself can try to adapt by changing its own timing with respect to, for example, shutter speed and/or frame rate. To find the present baud rate, the receiver can observe the bit rate period and message length. Note that in this case, the back channel is not needed to pass along the baud rate to the luminaire. In some embodiments, note that the receiving device can request changes in baud rate based on ambient conditions. For example, if a given receiving device includes a camera and a light sensor, then ambient light conditions can be sensed and this information can be fed back to the luminaire to adjust baud rate to improve signal to noise ratio. For instance, in cases of high ambient light, the optimal baud rate might be smaller to keep the desired signal to noise ratio. However, the ambient light might be a different waveform (and wavelength) such as IR. Thus, the amplitude and wavelength of ambient light can be measured to assess same.

The method continues with determining at 711 whether or not the ID being transmitted by the luminaire is decodable at the given baud rate. If not, then the process can repeat back to 703 in effort to determine a better baud rate. On the other hand, if the ID being transmitted by the luminaire is decodable at the given baud rate, then the method continues with decoding 713 LCom packets.

The method may further include monitoring 715 for changes of luminaire in frame. For instance, in some embodiments, the appearance of the luminaires in the camera frame can be monitored, and the baud rate can be adjusted based on this information. In one such embodiment, the receiving device 200 periodically (e.g., every 3-30 frames) recalculates the optimal baud rate based on the visualization of the luminaires 100 in the camera frame. In some cases, the receiving device 200 can optionally try to adjust its own settings to optimize decoding or deal with situations where luminaire control is not available for whatever reason. In still other scenarios, there may be a case where the needed baud rate is too fast for the luminaire. One such example of this is the case where the luminaire fills up only a small portion of the screen. For a linear light, this might just mean that the user should rotate the receiving device 200 to better align the raster lines perpendicular to the long dimension of the luminaire, as shown in FIG. 6A, for instance. In such cases, the user could be, for instance, prompted to rotate the receiving device accordingly. In still other example embodiments, if the needed baud rate is not available, then the user may be alerted (e.g., generate and send alert message to display screen of receiving device 200).

Thus, after iterating through the methodology as needed, the baud rate can be set for reliable decoding regardless of any initial mismatch of the transmitting luminaire 100 and receiving device 200. As will be appreciated, the methodology allows for both adjusting the baud rate at the transmitter side, and further allows the effective baud rate to be changed using internal adjustments of the receiving device 200. These internal adjustments may include changes to parameters such as camera shutter speed, camera resolution, camera frame rate, camera shutter mode, and signal gain (ISO), to name a few examples. For instance, a camera of a given receiver device 200 that is imaging the ceiling in video mode might use a low ISO, fixed frame rate/shutter speed, and video resolution initially. If possible, the device 200 can be switched (manually by user or automatically by LCom-based navigation application 216) from video mode to camera mode to utilize slower shutter speeds than 1/30 seconds. This effectively increases the baud rate as now the sampling rate is slower. To compensate for the increased light with the slower shutter speed, the ISO can decrease. This example highlights two types of camera parameters that include: direct timing parameters, and light compensation parameters that do not directly affect timing but compensate for timing parameters for proper brightness. Timing parameters include: shutter speed, frame rate, resolution, and shutter mode. The compensation parameters include: ISO, aperture, and filters. Depending on the camera composition constraints and LCom-based application 216 requirements, the timing parameters can be adjusted to effectively change the baud rate from the point of view of the receiving device 200 while the compensation parameters adjust the light level back to optimal signal levels. Thus, adjustments to baud rate to not impact the clarity of the imagery. As will be appreciated in light of this disclosure, this methodology for the dynamic setting of baud rate is optional, and may be used in conjunction with a sub-raster line sampling method as further provided herein, but need not be used in all embodiments.

Sub-Raster Line Sampling

Figure 10A:
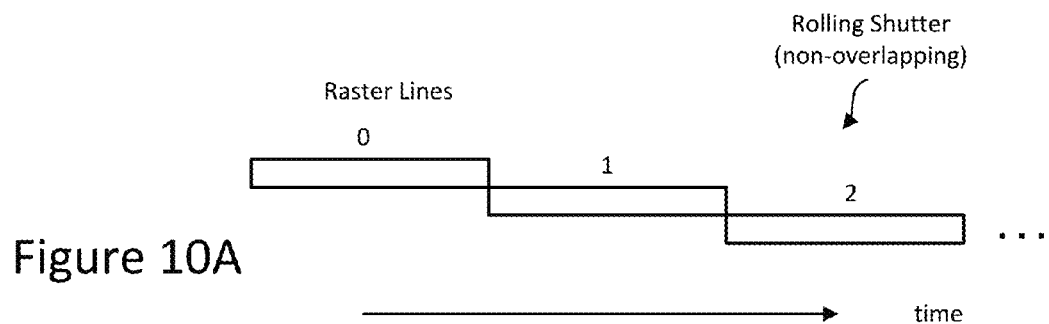
FIGS. 10A and 10B illustrate raster lines collected from true rolling shutter mode overlapping rolling shutter mode, respectively.
Figure 10B:
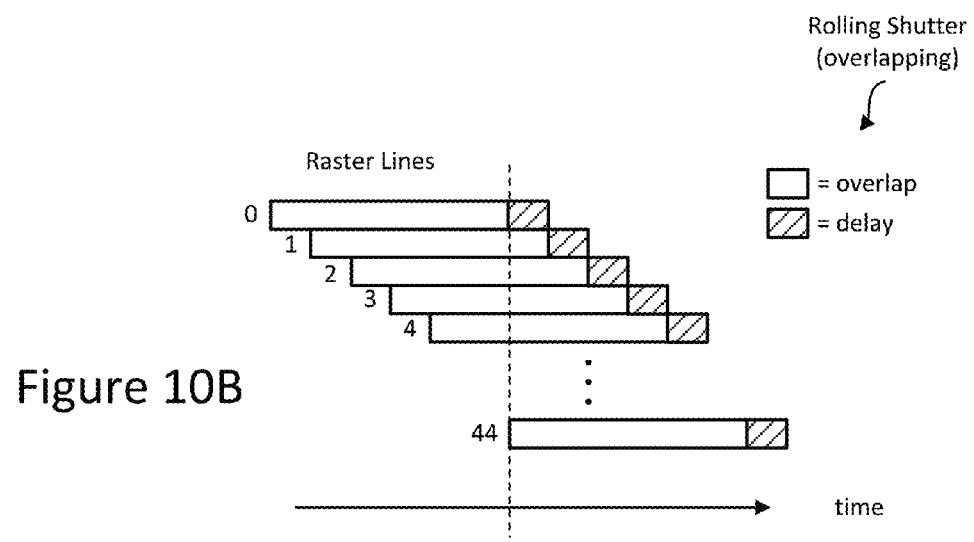

As previously stated, the rolling shutter mode for a CMOS camera describes the ability to collect raster line data sequentially. FIGS. 10A and 10B compare and contrast true rolling shutter mode (FIG. 10A) to a more typical overlapping rolling shutter mode (FIG. 10B). As most cameras use overlapping rolling shutter mode, the effective sampling rate is significantly reduced. In a true rolling shutter mode as shown in FIG. 10A, each raster line is sequentially captured with no delay or overlap between raster lines. Most cameras are not capable of achieving such a true rolling shutter mode due to various practical reasons including the fact that the circuitry needed to achieve such a configuration is more expensive and complex as well as the notion that typical applications that exploit the rolling shutter mode do not require a true rolling shutter (and therefore are tolerant of imperfections such as overlap). FIG. 10B shows the more common and pervasive overlapping shutter mode where each raster line is also sequentially captured but typically with some delay between raster lines (as depicted with cross-hatching) and overlap between raster lines, as shown. In this example scenario, for instance, collection for each of the first forty-four raster lines begins before collection of the first raster line (0) is completed. The collection of the forty fifth raster line (44) begins at the end of the collection of the first raster line (0). Because of this overlap, the effective sampling rate of the given camera is relatively low.

Figure 11A:
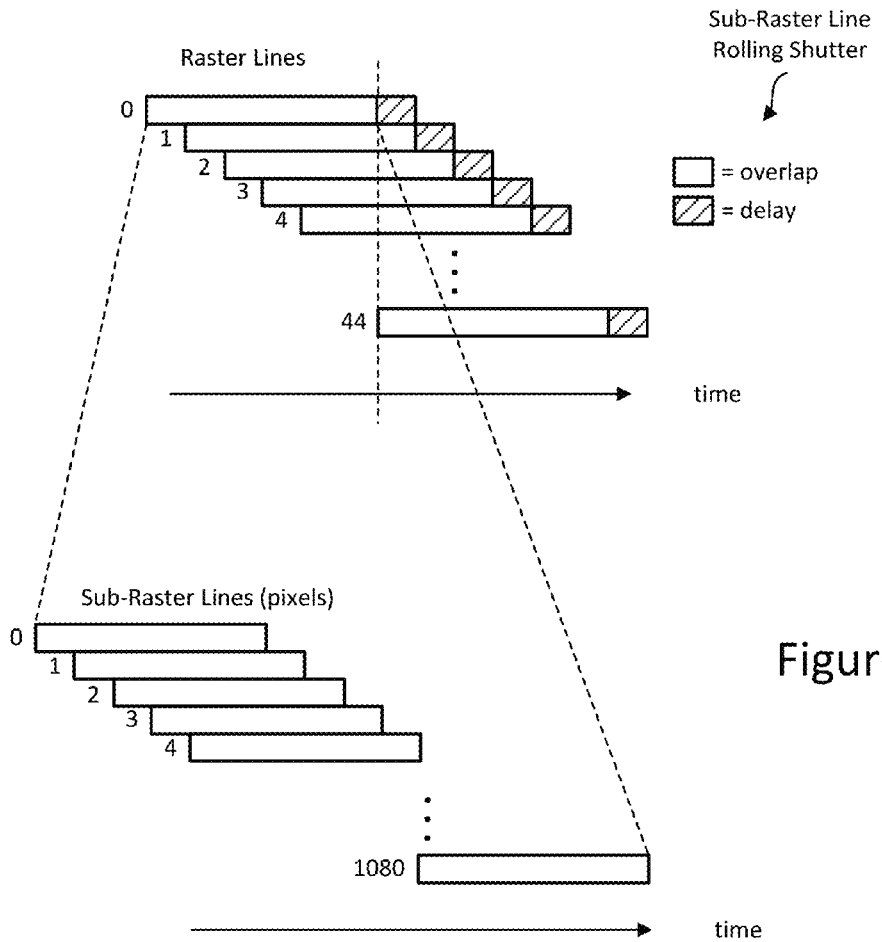
FIG. 11A illustrates sub-raster lines collected during a rolling shutter mode, in accordance with an embodiment of the present disclosure.

FIG. 11A shows each raster line being broken down into sub-raster lines or individual pixels, in accordance with an embodiment. Each pixel behaves the same way as the raster lines where each one is sequentially measured. This sequential sampling allows the camera to sample at much higher frequencies than the original raster lines. As can be seen, the sampling rate is a combination of horizontal (pixels in the same raster line) and vertical pixels (pixels in the next raster line). As previously explained, typical effective sampling rates of the raster lines assuming 60 lines of overlap can be as small as 120 raster lines per frame. Utilizing sub-raster lines to sample data LCom signal data as provided herein can supplement the raster line data or it can be the dominant data collection method.

Figure 11B:
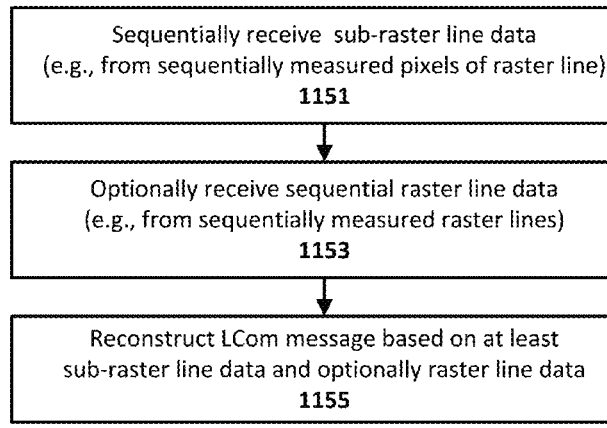
FIG. 11B illustrates a methodology for sub-raster line sampling, in accordance with an embodiment of the present disclosure.

FIG. 11B illustrates a methodology for sampling LCom signals with sub-raster line sampling, according to an embodiment. The method can be carried out, for example, by one of the applications 216 available in memory 210 that is programmed to receive image data from the camera 252 of the device 200. As can be seen, the method includes sequentially receiving 1151 sub-raster line data, which in this example embodiment is from sequentially measured pixels of each sequential raster line. The method may further include optionally receiving 1153 sequential raster line data from sequentially measured raster lines. The method continues with reconstructing 1155 the given LCom message based on at least the sub-raster line data and optionally the raster line data. Stitching sub-raster lines from different raster lines can be readily carried out given the timing of pixel collecting, which is constant for a given camera 252 and thus readily knowable by or otherwise accessible to the device 200 and therefore the application 252. As will be appreciated, these timing parameters can be used to reconstruct the LCom waveform. Factors such as delays between raster lines and delays between frames of camera data can be corrected, since the LCom message from the luminaire 100 repeats continuously. Therefore any gaps in the bit pattern can be filled in with future data or an otherwise iterative process.

Figure 12:
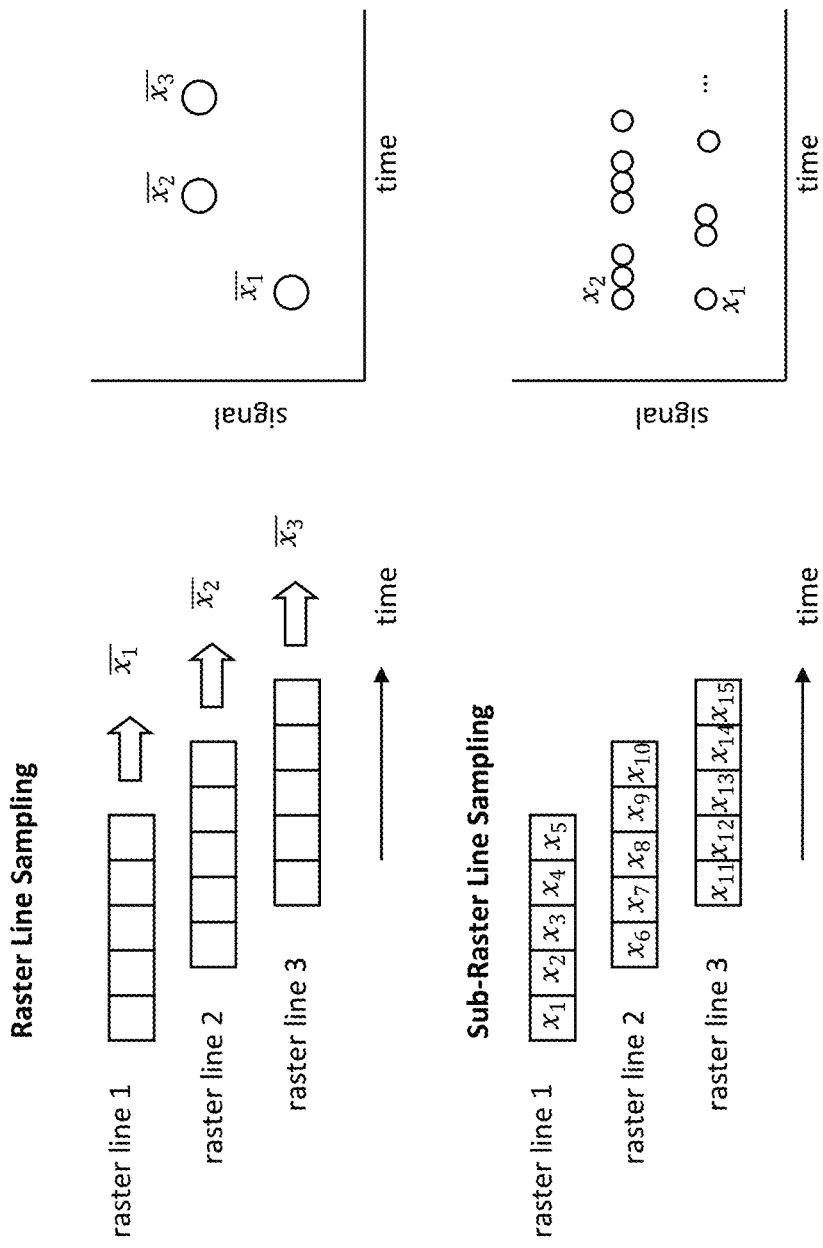
FIG. 12 illustrates raster line sampling and sub-raster line, along with corresponding plotted signal results, in accordance with an embodiment of the present disclosure.

FIG. 12 shows the difference between raster lines and sub-raster lines showing the multiple of data points. In operation, an image is subdivided into a sequence of raster lines. Each raster line can be transmitted in the form of an analog signal as it is read from the sensor array of the camera, can be further divided into discrete pixels for processing in the computing device 200. In raster line sampling, each raster line therefore translates to an analog signal (generally indicated as $\overline{x_1}$, $\overline{x_2}$, $\overline{x_3}$, etc. in the top half of FIG. 12) representative of that raster line. In contrast, for sub-raster line sampling, each pixel of each raster line translates to an analog signal (generally indicated as $\overline{x_1}$, $\overline{x_2}$, $\overline{x_3}$, ..., $\overline{x_{15}}$, etc. in the bottom half of FIG. 12) representative of that pixel. Other sub-raster line resolutions can be used as well, and the present disclosure is not intended to be limited to pixels. Other embodiments might have a sub-raster line resolution of any number of pixels (e.g., 2, 3, 4, 5, etc, up to one less than a complete raster line). To this end, use of the term sub-raster line herein is intended to cover any number N of pixels in a given raster line having a total number of T pixels, wherein N is less than T. In any case, the higher sampling frequency is clear with respect to sub-raster line sampling as compared to raster line sampling.

A given system might include, for example, 1,000 luminaires in a store that are all transmitting their ID's through LCom-based signaling. At any one spot in the store, a user with a smartphone or other receiver device may only see one to three luminaires in one camera frame. As the user moves, the number of luminaires and size varies in each camera frame. By using the sub-raster line pixel data, the waveform can be sampled at a much higher frequency than averaging the entire raster line alone.

A typical example would be an iPhone 6 with a 4-MP camera running at a frame rate of 30 fps. Other fixed parameters include, for example, frame resolution and raster line timings such as 1334×750 pixels and 60 overlapping raster lines (of course, these parameters can vary from one device 200 to another). In this example case, the effective sampling rate is [750 raster lines]*[30 fps]/[60 overlapping raster lines per frame]=375 Hz. However, the sub-raster line sampling rate is [1334 pixels]/[60 overlapping sub-raster lines]*[750 raster lines]*[30 fps]/[60 overlapping raster lines per frame]=8.3 kHz, which is about 22× faster than the 375 Hz overlapping raster line sampling rate.

For true rolling shutter modes of both raster lines and sub-raster lines (e.g., pixels), the difference is more pronounced. In this case, the sampling rate of raster lines is [750 raster lines]×[30 fps]=2.2 kHz. However, the sub-raster line or pixel rate is [1334 pixels]*[750 raster lines]×[30 fps]=30 MHz, which is about 14,000× faster than the 2.2 kHz raster line sampling rate. Even the overlapping raster lines and pixels for the sub-raster line sampling is faster than the non-overlapping raster lines by a factor of almost 4.

Numerous applications and variation will be apparent in light of this disclosure. One example scenario is to sample both the raster lines and sub-raster lines in a manner which allows different LCom pulse trains to be decoded. For instance, the LCom transmitter (luminaire 100) could send a combined signal on two different baud rates (slow and fast, such as shown in FIG. 9). The slower baud rate information could be decoded using the raster lines. The faster baud rate information can be decoded using the sub-raster line decoding, as provided herein. This would be useful, for example, where the faster baud rate information is considered lower priority information. For instance, the luminaire ID could be transmitted at a slow baud rate, so as to allow for location finding in the context of a navigation application (or other application specific task). On the other hand, lower priority information such as the firmware version and decoding parameters can be transmitted at a faster baud rate. Such lower priority information may be used, for instance, to optimize LCom communication but is not necessarily needed to carry out and sustain LCom-based communications.

Numerous embodiments will be apparent in light of this disclosure. One example embodiment provides a method for decoding light-based communication (LCom) signals. The method includes receiving sub-raster line data from an image capture device, and reconstructing a first LCom message based on the sub-raster line data. In some cases, the method is carried out at least in part on a mobile computing device including a digital camera capable of imaging LCom signals. In some cases, the method is carried out at least in part as part of a navigation application executable on a mobile computing device including a digital camera capable of imaging LCom signals. In some cases, receiving sub-raster line data from the image capture device includes sequentially receiving measured data representative of each individual pixel of each raster line. In some cases, receiving sub-raster line data from the image capture device includes sequentially receiving measured data representative of a plurality of pixels of each raster line, where each raster line has T total pixels and the measured data representative of the plurality of pixels includes N pixels, N being less than T. In some cases, the method further includes receiving raster line data from the image capture device, and reconstructing a second LCom message based on the raster line data. In some cases, receiving raster line data from the image capture device includes sequentially receiving measured data representative of each individual raster line. In some cases, the first LCom message is associated with a first baud rate and the second LCom message is associated with a second baud rate different than the first baud rate. In some cases, reconstructing the first LCom message based on the sub-raster line data includes stitching together sub-raster line data from different raster lines, based on timing of pixel collecting, the timing being a constant of the image capture device. In some cases, the first LCom message is received multiple times and decoded by repeating the receiving and reconstructing. Another embodiment provides a non-transitory computer readable medium encoded with instructions that, when executed by one or more processors, causes a process for decoding light-based communication (LCom) signals to be carried out, the process including the methodology as variously described in this paragraph. The non-transitory computer readable medium may include, for example, one or more machine readable mediums, such as a hard disk, ROM, solid state drive, thumb drive, embedded controller memory, compact disc, server computer, or other such non-transitory mediums that can be accessed by one or more processors so that the instructions thereon can be executed to carry out the process. Another example embodiment provides a lighting driver controller. The controller includes: a processor, and a memory accessible to the processor and encoding a plurality of instructions that when executed by the processor cause a process for setting a baud rate for light-based communication (LCom) to be carried out, the process including the methodology as variously described in this paragraph. Note that the process so encoded on the computer readable medium or memory of the lighting driver controller need not be carried out, and may remain unexecuted in some such embodiments.

Another example embodiment provides a mobile computing device. The device includes: a digital camera having a rolling shutter mode; and a processor operatively coupled with the camera and configured to: receive sub-raster line data from the camera; and reconstruct a first LCom message based on the sub-raster line data. In some cases, the device further includes a navigation application executable by the processor, wherein the first LCom message informs the navigation application. In some cases, the processor receives sub-raster line data from the camera by sequentially receiving measured data representative of each individual pixel of each raster line. In some cases, the processor receives sub-raster line data from the camera by sequentially receiving measured data representative of a plurality of pixels of each raster line, where each raster line has T total pixels and the measured data representative of the plurality of pixels includes N pixels, N being less than T. In some cases, the processor is further configured to: receive raster line data from the camera, and reconstruct a second LCom message based on the raster line data. In some cases, the processor receives raster line data from the camera by sequentially receiving measured data representative of each individual raster line. In some cases, the first LCom message is associated with a first baud rate and the second LCom message is associated with a second baud rate different than the first baud rate. In some cases, the processor reconstructs the first LCom message based on the sub-raster line data by stitching together sub-raster line data from different raster lines, based on timing of pixel collecting, the timing being a constant of the camera. In some cases, the first LCom message is received multiple times and decoded by the processor causing the receiving and reconstructing to be repeated. Note that the process so encoded on the memory of the computing device need not be carried out, and may remain unexecuted in some such embodiments The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

What is claimed is:

1. A method for decoding light-based communication (LCom) signals, the method comprising:
 receiving sub-raster line data encoding a first LCom message and raster line data encoding a second LCom message from an image capture device, wherein the sub-raster line data and raster line data are transmitted from a luminaire in a combined signal;
 reconstructing the first LCom message based on the sub-raster line data; and
 reconstructing the second LCom message based on the raster line data.

2. The method of claim 1, wherein the method is carried out at least in part on a mobile computing device including a digital camera capable of imaging LCom signals.

3. The method of claim 1, wherein the method is carried out at least in part as part of a navigation application executable on a mobile computing device including a digital camera capable of imaging LCom signals.

4. The method of claim 1, wherein receiving sub-raster line data from the image capture device includes sequentially receiving measured data representative of each individual pixel of each raster line.

5. The method of claim 1, wherein receiving sub-raster line data from the image capture device includes sequentially receiving measured data representative of a plurality of pixels of each raster line, where each raster line has T total pixels and the measured data representative of the plurality of pixels includes N pixels, N being less than T.

6. The method of claim 1, wherein receiving raster line data from the image capture device includes sequentially receiving measured data representative of each individual raster line.

7. The method of claim 1, wherein the first LCom message is associated with a first baud rate and the second LCom message is associated with a second baud rate different than the first baud rate.

8. The method of claim 1, wherein reconstructing the first LCom message based on the sub-raster line data includes stitching together sub-raster line data from different raster lines, based on timing of pixel collecting, the timing being a constant of the image capture device.

9. The method of claim 1, wherein the first LCom message is received multiple times and decoded by repeating the receiving and reconstructing.

10. A non-transitory computer readable medium encoded with instructions that, when executed by one or more processors, causes a process to be carried out for decoding light-based communication (LCom) signals, the process comprising:
receiving sub-raster line data encoding a first LCom message and raster line data encoding a second LCom message from an image capture device, wherein the sub-raster line data and raster line data are transmitted from a luminaire in a combined signal;
reconstructing the first LCom message based on the sub-raster line data; and
reconstructing the second LCom message based on the raster line data.

11. The computer readable medium of claim 10, wherein the non-transitory computer readable medium is part of a mobile computing device.

12. The computer readable medium of claim 10, wherein the process is part of a navigation application.

13. The computer readable medium of claim 10, wherein receiving sub-raster line data from the image capture device includes sequentially receiving measured data representative of each individual pixel of each raster line.

14. The computer readable medium of claim 10, wherein receiving sub-raster line data from the image capture device includes sequentially receiving measured data representative of a plurality of pixels of each raster line, where each raster line has T total pixels and the measured data representative of the plurality of pixels includes N pixels, N being less than T.

15. The computer readable medium of claim 10, wherein receiving raster line data from the image capture device includes sequentially receiving measured data representative of each individual raster line.

16. The computer readable medium of claim 10, wherein the first LCom message is associated with a first baud rate and the second LCom message is associated with a second baud rate different than the first baud rate.

17. The computer readable medium of claim 10, wherein reconstructing the first LCom message based on the sub-raster line data includes stitching together sub-raster line data from different raster lines, based on timing of pixel collecting, the timing being a constant of the image capture device.

18. The computer readable medium of claim 10, wherein the first LCom message is received multiple times and decoded by repeating the receiving and reconstructing.

19. A mobile computing device, comprising:
a digital camera having a rolling shutter mode; and
a processor operatively coupled with the camera and configured to:
receive sub-raster line data encoding a first LCom message and raster line data encoding a second LCom message from the camera, wherein the sub-raster line data and raster line data are transmitted from a luminaire in a combined signal;
reconstruct the first LCom message based on the sub-raster line data; and
reconstruct the second LCom message based on the raster line data.

20. The device of claim 19, further comprising a navigation application executable by the processor, wherein the first LCom message informs the navigation application.

21. The device of claim 19, wherein the processor receives sub-raster line data from the camera by sequentially receiving measured data representative of each individual pixel of each raster line.

22. The device of claim 19, wherein the processor receives sub-raster line data from the camera by sequentially receiving measured data representative of a plurality of pixels of each raster line, where each raster line has T total pixels and the measured data representative of the plurality of pixels includes N pixels, N being less than T.

23. The device of claim 19, wherein the processor receives raster line data from the camera by sequentially receiving measured data representative of each individual raster line.

24. The device of claim 19, wherein the first LCom message is associated with a first baud rate and the second LCom message is associated with a second baud rate different than the first baud rate.

25. The device of claim 19, wherein the processor reconstructs the first LCom message based on the sub-raster line data by stitching together sub-raster line data from different raster lines, based on timing of pixel collecting, the timing being a constant of the camera.

26. The device of claim 19, wherein the first LCom message is received multiple times and decoded by the processor causing the receiving and reconstructing to be repeated.

* * * * *